United States Patent
Yi et al.

(10) Patent No.: US 12,051,275 B2
(45) Date of Patent: Jul. 30, 2024

(54) VIDEO PROCESSING METHOD AND APPARATUS FOR ACTION RECOGNITION

(71) Applicant: Tencent Technology (Shenzhen) Company Limited, Guangdong (CN)

(72) Inventors: Yang Yi, Guangdong (CN); Feng Li, Guangdong (CN)

(73) Assignee: Tencent Technology (Shenzhen) Company Limited, Guangdong (CN)

(*) Notice: Subject to any disclaimer, the term of this patent is extended or adjusted under 35 U.S.C. 154(b) by 507 days.

(21) Appl. No.: 17/343,088

(22) Filed: Jun. 9, 2021

(65) Prior Publication Data
US 2021/0326597 A1    Oct. 21, 2021

Related U.S. Application Data

(63) Continuation of application No. PCT/CN2020/093077, filed on May 29, 2020.

(30) Foreign Application Priority Data

Jul. 29, 2019   (CN) .......................... 201910690174.8

(51) Int. Cl.
*G06V 40/20*   (2022.01)
*G06F 18/214*   (2023.01)
(Continued)

(52) U.S. Cl.
CPC ............ *G06V 40/28* (2022.01); *G06F 18/214* (2023.01); *G06V 10/764* (2022.01); *G06V 10/82* (2022.01);
(Continued)

(58) Field of Classification Search
CPC ...... G06V 40/28; G06V 10/764; G06V 10/82; G06V 20/20; G06V 20/40; G06V 20/41;
(Continued)

(56) References Cited

U.S. PATENT DOCUMENTS

| | | | |
|---|---|---|---|
| 10,255,683 B1* | 4/2019 | Gopal | G06V 20/52 |
| 2002/0049687 A1* | 4/2002 | Helsper | H04L 41/0213 |
| | | | 706/45 |

(Continued)

FOREIGN PATENT DOCUMENTS

| | | |
|---|---|---|
| CN | 109886090 A | 6/2019 |
| CN | 109919031 A | 6/2019 |

(Continued)

OTHER PUBLICATIONS

International Search Report and Written Opinion issued Aug. 21, 2020 in International Application No. PCT/CN2020/093077, with English translation, 9 pgs.

(Continued)

*Primary Examiner* — Mia M Thomas
(74) *Attorney, Agent, or Firm* — ArentFox Schiff LLP

(57) ABSTRACT

In a video processing method, a video frame sequence comprising a moving target is obtained. According to the video frame sequence and by processing circuitry of a neural network model, a motion state feature representing the moving target is obtained. The motion state feature is expressed in a time sequence of the video frame sequence. A result of matching between the motion state feature of the moving target and a motion state feature of a designated target is obtained. The moving target is determined as the designated target in response to a similarity between the motion state feature of the moving target and the motion state feature of the designated target being greater than a threshold. According to the motion state feature of the moving target and by using a classifier, a probability that the moving target pertains to an action category corresponding to the designated target is obtained.

19 Claims, 16 Drawing Sheets

(51) Int. Cl.
*G06V 10/764* (2022.01)
*G06V 10/82* (2022.01)
*G06V 20/20* (2022.01)
*G06V 20/40* (2022.01)
*G06N 3/04* (2023.01)
*G06N 7/01* (2023.01)

(52) U.S. Cl.
CPC .............. *G06V 20/20* (2022.01); *G06V 20/40* (2022.01); *G06V 20/41* (2022.01); *G06V 20/46* (2022.01); *G06V 40/20* (2022.01); *G06N 3/04* (2013.01); *G06N 7/01* (2023.01)

(58) Field of Classification Search
CPC ........ G06V 20/46; G06V 40/20; G06V 20/42; G06F 18/214; G06N 3/04; G06N 7/01; G06N 3/045; G06N 3/084; G06T 7/251; G06T 2207/10016; G06T 2207/20081; G06T 2207/20084; G06T 2207/20221
See application file for complete search history.

(56) References Cited

U.S. PATENT DOCUMENTS

| | | | |
|---|---|---|---|
| 2018/0024641 A1 | 1/2018 | Mao et al. | |
| 2018/0249179 A1* | 8/2018 | Han | H04N 19/137 |
| 2019/0122048 A1* | 4/2019 | Eaton | G06N 3/042 |
| 2020/0143191 A1* | 5/2020 | Du | G06V 30/19173 |
| 2020/0349711 A1* | 11/2020 | Duke | G06T 7/11 |
| 2021/0056420 A1* | 2/2021 | Konishi | G06V 10/82 |
| 2021/0097403 A1* | 4/2021 | Park | G06T 1/20 |
| 2021/0117755 A1* | 4/2021 | Mahale | G06N 3/063 |
| 2021/0180571 A1* | 6/2021 | Yang | F03D 80/40 |
| 2021/0266516 A1* | 8/2021 | Dahi | H04N 13/128 |
| 2021/0326597 A1* | 10/2021 | Yi | G06V 10/82 |
| 2021/0366125 A1* | 11/2021 | Jia | G06T 7/11 |
| 2022/0044068 A1* | 2/2022 | Chai | G01S 7/4802 |

FOREIGN PATENT DOCUMENTS

| | | | | |
|---|---|---|---|---|
| CN | 109961005 A | | 7/2019 | |
| CN | 110472531 A | * | 11/2019 | ......... G06K 9/00718 |
| CN | 110472531 A | | 11/2019 | |

OTHER PUBLICATIONS

Supplemental European Search Report issued Aug. 29, 2022 in Application No. 20847097.1.(10 pages).
Zhao Baojun et al: "Deep Spatial-Temporal Joint Feature Representation for Video Object Detection", Sensors, vol. 18, No. 3, Dec. 31, 2018 (Dec. 31, 2018), p. 774.
Porikli F Etal: "Multi-Kernel Object Tracking", IEEE International Conference on Multimedia and Expo, 2005. ICME 2005. Amsterdam, The Netherlands, Jul. 6-8, 2005, IEEE, Piscataway, NJ, USA, Jul. 6, 2005 (Jul. 6, 2005), pp. 1234-1237.
Chinese Office Action issued May 7, 2023 in Application No. 201910690174.8.(24 pages).
Wang, Limin, et al. "Temporal segment networks: Towards good practices for deep action recognition." European conference on computer vision. Springer, Cham, 2016, pp. 1-16.
He, Kaiming, et al. "Deep residual learning for image recognition." Proceedings of the IEEE conference on computer vision and pattern recognition. 2016, pp. 1-12.
ChaLearn LAP IsoGD and ConGD datasets. ChaLearn Looking at People, https://gesture.chalearn.org/2016-looking-at-people-cvpr-challenge/isogd-and-congd-datasets, pp. 1-3.
Gesture Recognition Dataset: Jester, Qualcomm developer network, https://developer.qualcomm.com/software/ai-datasets/jester, pp. 1-9.
Chollet, François. "Xception: Deep learning with depthwise separable convolutions." Proceedings of the IEEE conference on computer vision and pattern recognition. 2017, pp. 1-8.
Zheng, Liang, et al. "Mars: A video benchmark for large-scale person re-identification." Computer Vision-ECCV 2016: 14th European Conference, Amsterdam, The Netherlands, Oct. 11-14, 2016, Proceedings, Part VI 14. Springer International Publishing, 2016, pp. 1-17.

* cited by examiner

VIDEO PROCESSING METHOD AND APPARATUS FOR ACTION RECOGNITION

RELATED APPLICATIONS

This application is a continuation of International Application No. PCT/CN2020/093077, filed on May 29, 2020, which claims priority to Chinese Patent Application No. 201910690174.8, entitled "VIDEO PROCESSING METHOD AND APPARATUS, ELECTRONIC DEVICE, AND STORAGE MEDIUM" and filed on Jul. 29, 2019. The entire disclosures of the prior applications are hereby incorporated by reference in their entirety.

FIELD OF THE TECHNOLOGY

This application relates to the field of computer technologies, including a video processing technology.

BACKGROUND OF THE DISCLOSURE

In recent years, video processing technology has been rapidly developed. The processing and understanding of video data have drawn considerable attention from researchers due to broad application prospects of the processing and understanding of video data in fields such as action recognition and personal identification. Further, accompanied with the development of deep learning, the wide application of convolutional neural networks in computer vision and the promising results obtained in fields such as recognition and detection, video behavior recognition based on convolutional neural networks has been extensively studied.

Currently, a method for processing and understanding of video data generally includes separately performing feature extraction on each frame in a video based on a neural network model, and then inputting features corresponding to all the frames to a pre-trained classifier, to determine a category of a moving target in the video. However, the foregoing method has a relatively low accuracy of recognizing a moving target.

SUMMARY

Embodiments of this application provide a video processing method and apparatus, an electronic device, and a storage medium, to improve the accuracy of recognizing a moving target in a video.

In an embodiment, a video processing method includes obtaining a video frame sequence including a moving target, and obtaining, according to the video frame sequence and by processing circuitry of a neural network model, a motion state feature representing the moving target, the motion state feature being expressed in a time sequence of the video frame sequence. The video processing method also includes obtaining a result of matching between the motion state feature of the moving target and a motion state feature of a designated target.

In an embodiment, a neural network model includes processing circuitry configured as a plurality of hierarchical modules, at least one multi-kernel temporal processing module, and a mean-pooling layer, each multi-kernel temporal processing module of the at least one multi-kernel temporal processing module being disposed between two adjacent hierarchical modules in the plurality of hierarchical modules. The mean-pooling layer is located behind a last hierarchical module. The hierarchical modules are configured to extract first feature data corresponding to video frames in a video frame sequence from input data stage by stage and output the first feature data. Each first feature data includes a spatial feature representing a moving target in the video frames, input data of a first-stage hierarchical module includes the video frame sequence, and input data of other stages of hierarchical modules are data outputted by a hierarchical module or a multi-kernel temporal processing module located at an upper stage thereof. The multi-kernel temporal processing module is configured to perform, in a time dimension according to time information of the video frames, convolution processing on target pixels in first feature data outputted by a target hierarchical module, to obtain corresponding second feature data. Each second feature data includes a time sequence feature representing the moving target in the time dimension. The target hierarchical module is a hierarchical module located at an upper stage of the multi-kernel temporal processing module, and the target pixels are pixels having identical positions in the first feature data outputted by the target hierarchical module. The mean-pooling layer is configured to perform mean pooling processing on first feature data outputted by a last-stage hierarchical module, to obtain a motion state feature of the moving target.

In an embodiment, a video processing apparatus includes processing circuitry configured to obtain a video frame sequence including a moving target, and obtain, according to the video frame sequence and by using a neural network model, a motion state feature representing the moving target, the motion state feature being expressed in a time sequence of the video frame sequence. The processing circuitry is also configured to obtain a result of matching between the motion state feature of the moving target and a motion state feature of a designated target.

In an embodiment, a non-transitory computer-readable storage medium stores computer-readable instructions thereon, which, when executed by a video processing apparatus, cause the video processing apparatus to perform a video processing method. The video processing method includes obtaining a video frame sequence including a moving target, and obtaining, according to the video frame sequence and by processing circuitry of a neural network model, a motion state feature representing the moving target, the motion state feature being expressed in a time sequence of the video frame sequence. The video processing method also includes obtaining a result of matching between the motion state feature of the moving target and a motion state feature of a designated target.

BRIEF DESCRIPTION OF THE DRAWINGS

To describe the technical solutions in the embodiments of this application more clearly, the following briefly describes the accompanying drawings showing the embodiments of this application. The accompanying drawings in the following description show exemplary embodiments of this application.

DETAILED DESCRIPTION

Figure 1A:
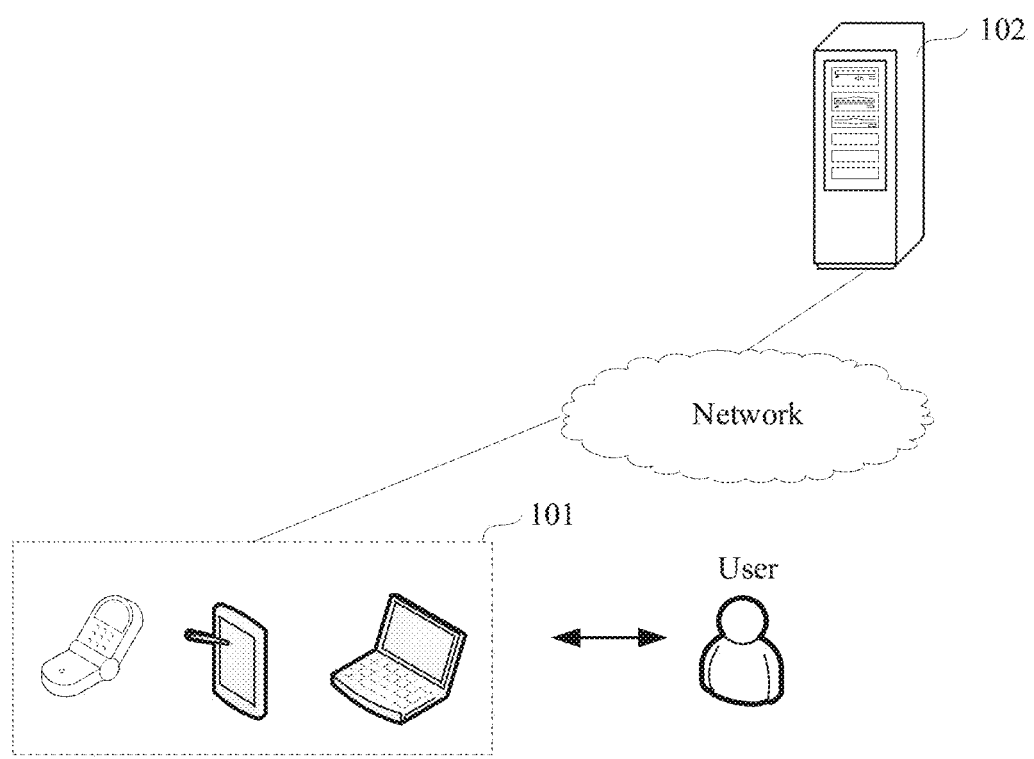
FIG. 1A is a schematic diagram of an application scenario of a video processing method according to an embodiment of this application.

To make the objectives, technical solutions, and advantages of embodiments of this application more comprehensible, the following describes the technical solutions in the embodiments of this application with reference to the accompanying drawings in the embodiments of this application.

To facilitate understanding, the following explains terms involved in the embodiments of this application.

Artificial Intelligence (AI) is a theory, method, technology, and application system that uses a digital computer or a machine controlled by the digital computer to simulate human intelligence, perceive an environment, acquire knowledge, and use knowledge to obtain an optimal result. In other words, AI is a comprehensive technology in computer science and attempts to understand the essence of intelligence and produce a new intelligent machine that can react in a manner similar to human intelligence. At is to study the design principles and implementation methods of various intelligent machines, to enable the machines to have the functions of perception, reasoning, and decision-making.

AI technology is a comprehensive discipline, and relates to a wide range of fields including both hardware-level technologies and software-level technologies. Basic AI technologies generally include technologies such as a sensor, a dedicated AI chip, cloud computing, distributed storage, big data processing technology, an operating/interaction system, and electromechanical integration. AI software technologies mainly include several major directions such as a computer vision (CV) technology, a speech processing technology, a natural language processing technology, and machine learning/deep learning.

For example, the embodiments of this application mainly relate to CV technology. CV is a science that studies how to use a machine to "see", and furthermore, is machine vision in which a camera and a computer are used for replacing human eyes to perform recognition, tracking, measurement, and the like on a target. CV further supports graphic processing, so that the computer processes the target into an image more suitable for human eyes to observe, or into an image transmitted to an instrument for detection. As a scientific discipline, CV studies related theories and technologies and attempts to establish an AI system that can obtain information from images or multidimensional data. The CV technologies generally include technologies such as image processing, image recognition, image semantic understanding (ISU), image retrieval, optical character recognition (OCR), video processing, video semantic understanding, video content/behavior recognition, three-dimensional object reconstruction, a three-dimensional (3D) technology, virtual reality, augmented reality, synchronous positioning, and map construction, and further include biological feature recognition technologies such as common face recognition and fingerprint recognition. For example, feature extraction may be performed through ISU.

For example, the embodiments of this application mainly relate to machine learning (ML), which is a multi-disciplinary subject involving a plurality of disciplines such as probability theory, statistics, approximation theory, convex analysis, and algorithm complexity theory. ML specializes in studying how a computer simulates or implements a human learning behavior to obtain new knowledge or skills, and reorganize an existing knowledge structure, so as to keep improving its performance. The ML is the core of AI, is a basic way to make the computer intelligent, and is applied to various fields of AI. The ML and deep learning generally include technologies such as an artificial neural network, a belief network, reinforcement learning, transfer learning, inductive learning, and learning from demonstrations. For example, a neural network model and a classifier may be trained through ML, to determine a motion state feature by using the neural network model, or to predict, by using the classifier, a probability that a moving target pertains to an action category.

Sign language recognition as a part of body language understanding plays an important role. On the one hand, sign language recognition is a main means of virtual reality human-computer interaction. On the other hand, sign language recognition is also an auxiliary tool for people with speech and hearing disabilities to communicate with others by using a computer. Each sign language is formed by a gesture sequence, and each gesture is formed by a handshape change sequence. A main task of the sign language recognition is to determine a category of to-be-recognized sign language according to features of the extracted to-be-recognized sign language, and classification is then performed by using a classifier. According to different sign language input media, a sign language recognition system may be classified into two types: a camera (vision)-based sign language recognition system and a device input (such as a data glove, stylus, a mouse, or a position tracker)-based sign language recognition system. Currently, sign language recognition methods are mainly based on template matching, a neural network, a hidden Markov model (HMM), dynamic time warping (DTW), and the like.

Person re-identification, also referred to person ReID, is a technology that determines, by using computer vision technology, whether there is a specified person in an image or a video sequence. A monitored person image is used to retrieve the person image across devices. The person ReID aims to make up for a visual limitation of a currently fixed camera, may be combined with the person identification/person tracking technology, and is widely applicable to the fields such as intelligent video monitoring and intelligent security protection.

A multi-kernel temporal processing module is configured to enhance a time sequence feature between feature maps corresponding to a plurality of video frames.

Reshape is a function in which a quantity of rows, columns, and dimensions of a matrix may be adjusted.

Batch is a hyper-parameter in a neural network, and specifically refers to a quantity of samples processed by the neural network each time.

Any quantity of elements in the accompanying drawings is merely an example but not a limitation, and any term is merely used for clarification.

During specific practice, a related method for video processing and understanding of a video generally includes: performing feature extraction on each frame in a video based on a neural network model, and then inputting features corresponding to all the frames to a pre-trained classifier, to determine a category in which a moving target in the video is. Because the features extracted in the foregoing method are separately obtained from all the frames of images, the extracted features cannot reflect the continuity and correlation of the moving target in a time dimension, resulting in a relatively low accuracy of recognizing a moving target. Gesture recognition is used as an example. Each gesture action representing a specific meaning is formed by a series of continuous actions that have a determined time sequence relationship, a video frame sequence including the series of continuous actions needs to be obtained to recognize a gesture, and video frames in the video frame sequence are strictly arranged according to a time sequence of the actions. Feature extraction is separately performed on the video frames as in related methods, and a spatial feature of a hand action at a certain moment is obtained, and features corresponding to hand actions at different moments are independent of each other, thereby losing a time sequence relationship between the hand actions included in the video frame sequence. Therefore, the continuity and correlation of the gesture actions in the time dimension are ignored for the hand features obtained based on the related method, resulting in a relatively low accuracy of the gesture recognition.

Therefore, a structure of a related neural network is improved in this application. A multi-kernel temporal processing module capable of extracting a time sequence feature of a moving target in a time dimension from a video frame sequence is added to the related neural network. The improved neural network model includes a plurality of hierarchical modules, at least one multi-kernel temporal processing module, and a mean-pooling layer, each multi-kernel temporal processing module being disposed between two adjacent hierarchical modules in the plurality of hierarchical modules, and the mean-pooling layer being located behind a last hierarchical module. The hierarchical modules are configured to separately extract first feature data corresponding to video frames in the video frame sequence from input data stage by stage and output the first feature data, each first feature data including a spatial feature representing the moving target in the video frames, input data of a first-stage hierarchical module including the video frame sequence, and input data of the other stages of hierarchical modules being data outputted by a hierarchical module or a multi-kernel temporal processing module located at an upper stage thereof. The multi-kernel temporal processing module is configured to perform, in a time dimension according to time information of the video frames, convolution processing on target pixels in first feature data outputted by a target hierarchical module, to separately obtain corresponding second feature data, each second feature data including a time sequence feature representing the moving target in the time dimension, the target hierarchical module being a hierarchical module located at an upper stage of the multi-kernel temporal processing module, and the target pixels being pixels having identical positions in the first feature data outputted by the target hierarchical module. The mean-pooling layer is configured to perform mean pooling processing on feature data outputted by a last-stage hierarchical module, to obtain a motion state feature of the moving target.

Based on this, after the video frame sequence including the moving target is inputted to the neural network model, the motion state feature representing the moving target that is expressed in the time sequence of the video frame sequence may be obtained by using the neural network model. The motion state feature not only includes the spatial feature of the moving target in the video frames extracted by using the hierarchical module, but also includes the time sequence feature representing the moving target in the time dimension extracted by using the multi-kernel temporal processing module. That is, based on the neural network model, more comprehensive feature information can be obtained from the video frame sequence, thereby improving the accuracy of recognizing a moving target.

After the embodiments of this application are described, the present disclosure briefly describes application scenarios to which the technical solutions in this embodiment of this application are applicable. The application scenarios described below are merely used for describing rather than limiting the embodiments of this application. During specific implementation, the technical solutions provided in the embodiments of this application are flexibly applicable according to system requirements.

A video processing method in the embodiments of this application is applicable to action recognition scenarios, such as a gesture recognition scenario, a sign language recognition scenario, an action interaction scenario, and a behavior recognition scenario.

The action interaction scenario during human-computer interaction is used as an example below for schematic description. As shown in FIG. 1A, the application scenario includes a terminal device 101 and a server 102. The terminal device 101 is connected to the server 102 through a wireless or wired network, and the terminal device 101 is an electronic device having an image acquisition function, such as a smartphone, a tablet computer, an intelligent robot, a somatosensory game device, or a virtual reality (VR)

device. The server 102 is a server, a server cluster formed by several servers, or a cloud computing center.

The terminal device 101 acquires a video including a user, and then sends the acquired video to the server 102. The server 102 may directly perform action recognition on the user in the received video, determine an action category corresponding to an action performed by the user in the video, determine response data corresponding to the recognized action category according to a correspondence between stored action categories and response data, and send the response data to the terminal device 101. The terminal device 101 performs the response data returned by the server. The response data is not limited to text data, audio data, image data, video data, voice broadcasts, or control instructions. The control instructions include, but not limited to: an instruction for controlling a terminal device to display expressions, an instruction (such as guiding, navigation, photographing, or dancing) for controlling an action component of a terminal device to move, an instruction for presenting props or special effects on a screen of a terminal device, and an instruction for controlling a smart household.

The application scenario shown in FIG. 1A is further applicable to the sign language recognition scenario. The terminal device 101 acquires a video including gesture sign language of a user, and then sends the acquired video to the server 102. The server 102 may directly perform action recognition on the user in the received video, determine a sign language category corresponding to a sign language action in the video, determine semantic data corresponding to the recognized sign language category according to a correspondence between stored sign language categories and semantic data (the semantic data herein is response data), and send the semantic data to the terminal device 101. The semantic data may be text data or audio data. The terminal device 101 plays the semantic data returned by the server, so that other users may learn about a meaning corresponding to the sign language gestured by the user. Therefore, people with language barriers or hearing barriers may communicate with each other in a barrier-free manner.

In an embodiment, the method performed by the foregoing server 102 may be alternatively performed at the terminal device 101.

Figure 1B:
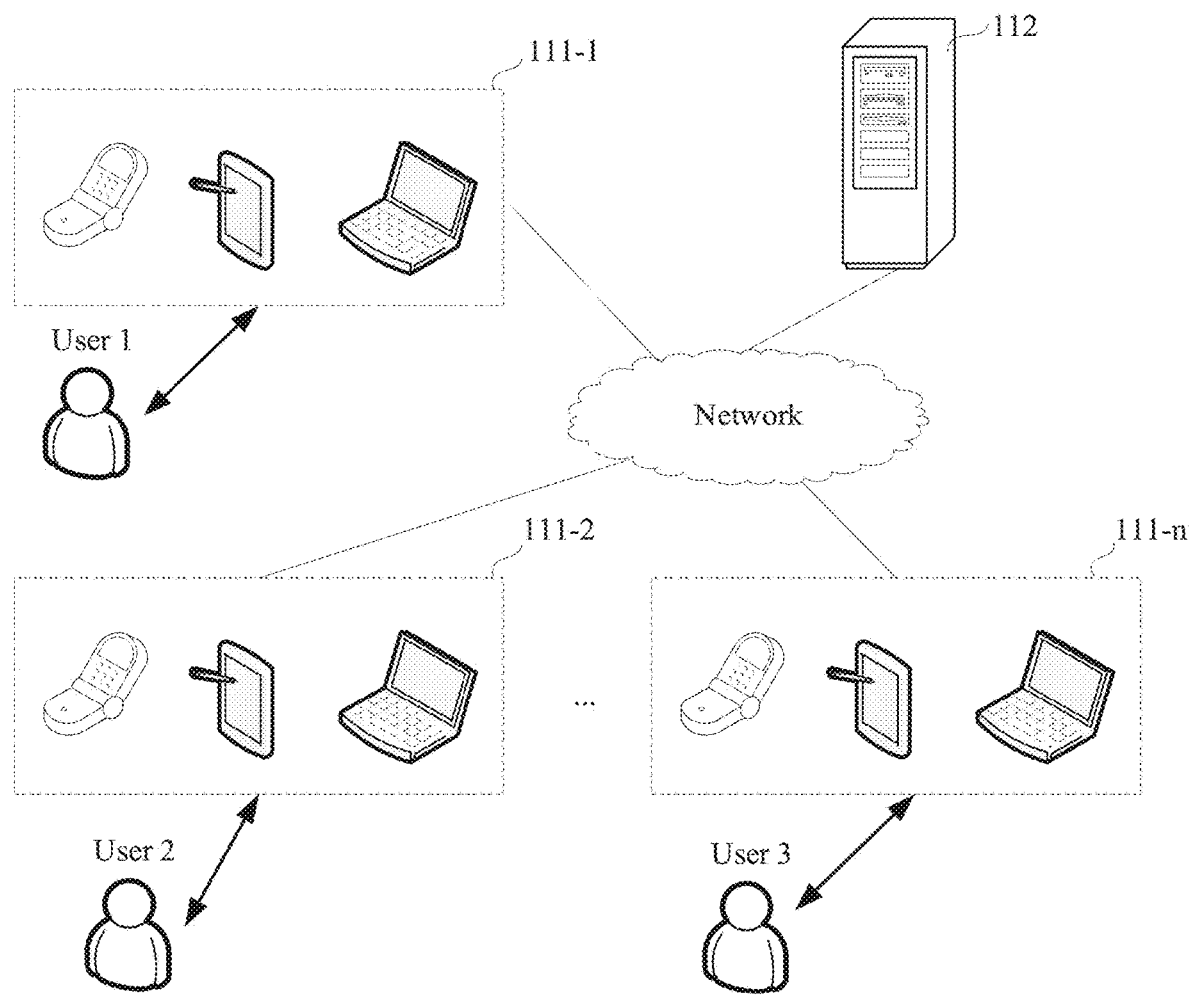
FIG. 1B is a schematic diagram of an application scenario of a video processing method according to an embodiment of this application.

As shown in FIG. 1B, the application scenario includes a plurality of terminal devices 111 (including a terminal device 111-1, a terminal device 111-2, . . . and a terminal device 111-n) and a server 112. For example, when the terminal device 111-1, the terminal device 111-2, . . . and the terminal device 111-n interact with each other by using the server 112, the terminal device 111-1 acquires a video including a user 1, and then sends the acquired video to the server 112. The server 112 may directly perform action recognition on the user 1 in the received video, determine an action category corresponding to an action performed by the user 1 in the video, determine response data corresponding to the recognized action category according to a correspondence between stored action categories and response data, and send the response data to the terminal device 111-1 and the terminal device 111-2, . . . and the terminal device 111-n that interact with the terminal device 111-1. The terminal device that receives the response data executes the response data. The response data is not limited to text data, audio data, image data, video data, presentation props, or special effects. For example, in a scenario of live broadcast on the Internet, an anchor in a broadcast booth performs a designated action. For example, the user 1 is the anchor. The terminal device 111-1 sends an acquired video including the designated action performed by the anchor to the server 112. The server 112 determines an action category corresponding to the designated action performed by the anchor in the video, determines a special effect corresponding to the action category, and then adds the corresponding special effect to live broadcast data. The terminal device (such as the terminal device 111-2, 111-3, . . . , or 111-n) of a viewer pulls the live broadcast data from the server 112, and presents the corresponding special effect on a live broadcast screen.

The video processing method in this embodiment of this application is further applicable to scenarios for recognizing and tracking a moving target in a video, such as a person ReID scenario, a monitoring security protection scenario, an intelligent transportation scenario, and a military target recognition scenario. Target recognition and tracking are performed mainly based on a motion state feature (for example, a body pose) of a target in this embodiment of this application.

Figure 1C:
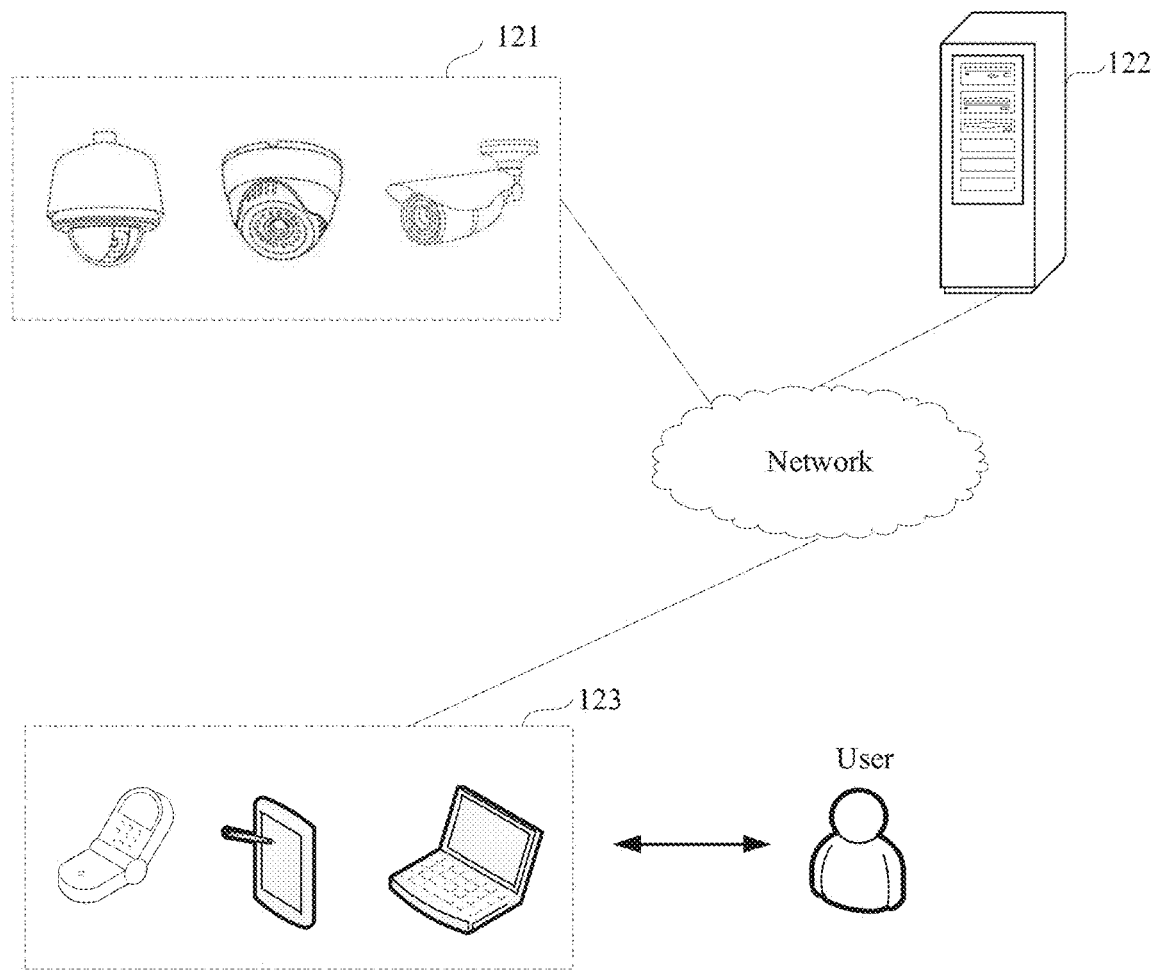
FIG. 1C is a schematic diagram of an application scenario of a video processing method according to an embodiment of this application.

The person ReID scenario is used as an example below for schematic description. As shown in FIG. 1C, the application scenario includes a monitoring device 121, a server 122, and a terminal device 123. The server 122 is connected to the monitoring device 121 and the terminal device 123 through the wireless network. The monitoring device 121 is an electronic device having an image acquisition function, such as a camera lens, a video camera, or a video recorder. The terminal device 123 is an electronic device having a network communication capability. The electronic device may be a smartphone, a tablet computer, or a portable personal computer. The server 122 is a server, a server cluster formed by several servers, or a cloud computing center.

The monitoring device 121 acquires a video in real time, and then sends the acquired video to the server 122. The server 122 may directly recognize persons in the received video, extract features of the persons included in the video, compare the features of the persons with features of a target character, and determine whether the video includes the target character. After recognizing the target character, the server 122 marks the target character in the video, and then sends the video marked with the target character to the terminal device 123, and the video marked with the target character may be played on the terminal device 123, so that relevant personnel tracks and analyzes the target character in the video.

In an embodiment, the method performed by the foregoing server 122 may be alternatively performed at the terminal device 123. The foregoing video may be alternatively a video pre-recorded by the monitoring device 121.

In an embodiment, the method provided in the embodiments of this application is not limited to the application scenarios shown in FIG. 1A, FIG. 1B, and FIG. 1C, and is further applicable to other application scenarios. This is not limited in the embodiments of this application. Functions that can be implemented by the devices in the application scenarios shown in FIG. 1A, FIG. 1B, and FIG. 1C are described in the subsequent method embodiments together. Details are not described herein.

To further describe the technical solutions provided in the embodiments of this application, the technical solutions are described in detail below with reference to the accompanying drawings and specific embodiments. Although the embodiments of this application provide method operational steps shown in the following embodiments or accompanying drawings, more or fewer operational steps may be included in the methods. In the steps in which no necessary causal relationship logically exists, the execution order of the steps is not limited to the execution orders provided in the embodiments of this application.

Figure 2:
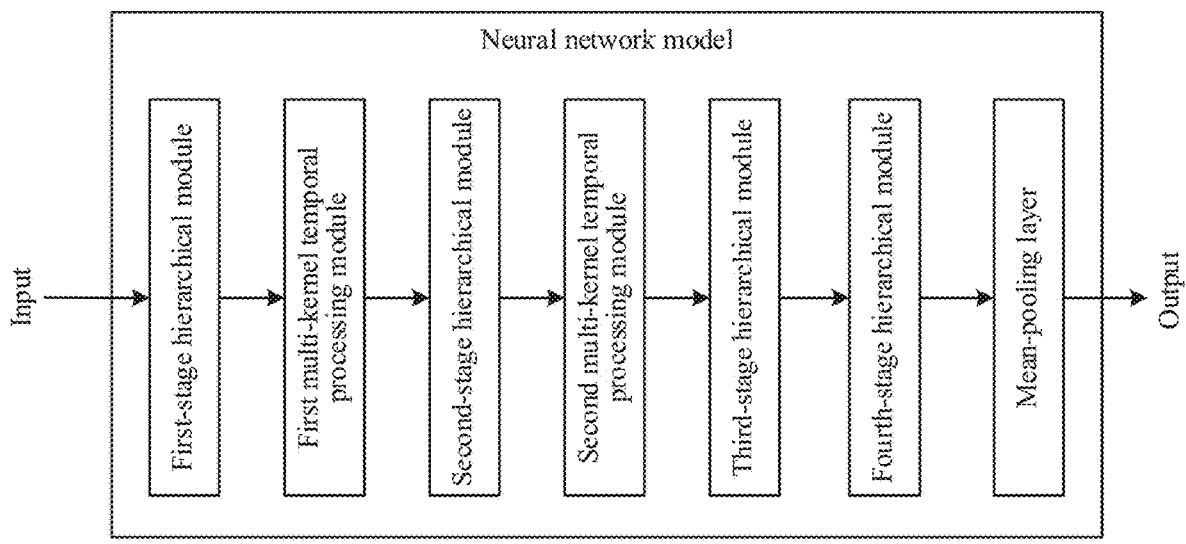
FIG. 2 is a schematic structural diagram of a neural network model according to an embodiment of this application.

FIG. 2 is a schematic structural diagram of a neural network model configured to process a video according to an embodiment of this application. The neural network model shown in FIG. 2 includes a plurality of hierarchical modules (such as a first-stage hierarchical module, a second-stage hierarchical module, a third-stage hierarchical module, and a fourth-stage hierarchical module in FIG. 2), at least one multi-kernel temporal processing module (such as a first multi-kernel temporal processing module and a second multi-kernel temporal processing module in FIG. 2), and a mean-pooling layer. Each multi-kernel temporal processing module of the at least one multi-kernel temporal processing module is disposed between two adjacent hierarchical modules in the plurality of hierarchical modules, and the mean-pooling layer being located behind a last hierarchical module.

The hierarchical modules in FIG. 2 are configured to separately extract first feature data corresponding to video frames in a video frame sequence from input data stage by stage and output the first feature data, each first feature data including a spatial feature representing a moving target, included in the video frame sequence, in the video frames.

Input data of the first-stage hierarchical module includes the video frame sequence, and the first-stage hierarchical module extracts first feature data corresponding to video frames from the inputted video frame sequence and outputs the first feature data. Input data of the other stages of hierarchical modules apart from the first-stage hierarchical module is first feature data outputted by a hierarchical module located at an upper stage thereof or second feature data outputted by the multi-kernel temporal processing module. Referring to FIG. 2, the first-stage hierarchical module extracts first feature data P1 corresponding to video frames from the inputted video frame sequence and outputs the first feature data P1, the second-stage hierarchical module processes second feature data Q1 outputted by the first multi-kernel temporal processing module to obtain first feature data P2 and outputs the first feature data P2, the third-stage hierarchical module processes the second feature data Q2 outputted by the second multi-kernel temporal processing module to obtain first feature data P3 and outputs the first feature data P3, and the fourth-stage hierarchical module processes the first feature data P3 to obtain first feature data P4 and outputs the first feature data P4.

In this embodiment of this application, feature data outputted by the hierarchical modules is collectively referred to as the first feature data, and feature data outputted by the multi-kernel temporal processing modules is collectively referred to as the second feature data.

Structures of the plurality of hierarchical modules may be the same or different. A single hierarchical module may include only one network layer. For example, a single hierarchical module includes only one convolutional layer. A single hierarchical module may alternatively include a plurality of identical or different network layers. For example, a single hierarchical module may include a convolutional layer and a max-pooling layer, or the single hierarchical module may include a plurality of different convolutional layers.

The neural network model described in FIG. 2 is merely an example. In actual application, the structures of the hierarchical modules, the quantity of hierarchical modules and the quantity of multi-kernel temporal processing modules included in the neural network model, and positions thereof may all be set according to system requirements. This is not limited in this embodiment of this application.

The video frame sequence inputted to the neural network model may be a continuous video, or may be an image sequence obtained by arranging, according to a time sequence, a plurality of discontinuous video frames captured from a video. The video frame sequence is essentially a four-dimensional matrix (B×T, C, H, W). B is a batch processing quantity, that is, a quantity of video frame sequences that the neural network model may process once. T is a frame sequence length, that is, a quantity of video frames included in one video frame sequence. C is a quantity of channels for images. H is a height of the images. W is a width of the images. In this case, the images are the video frames. For example, input information is that the batch processing quantity B=2, the frame sequence length T=8, the quantity of RGB channels C=3, the height H=224, and the width W=224. That is, the video frame sequence inputted to the neural network model is a four-dimensional matrix (2×8, 3, 224, 224). If the neural network model processes only one video frame sequence within the same period of time, B may be set to 1. That is, the neural network model may process T video frames in the one video frame sequence.

In this embodiment of this application, first feature data corresponding to video frames includes a plurality of two-dimensional pictures (that is, a two-dimensional matrix (H, W)), and each two-dimensional picture is a feature map. A quantity of feature maps included in the first feature data is equal to a corresponding quantity of channels. For example, if a dimension of first feature data outputted by the first hierarchical module is (16, 64, 112, 112), the quantity of feature maps included in the first feature data corresponding to one video frame is 64, and a size of each feature map is 112×112. A dimension and size of first feature data corresponding to video frames outputted by the same module are the same. Similarly, second feature data corresponding to the video frames also includes a plurality of feature maps.

The input data of the multi-kernel temporal processing module in FIG. 2 is the first feature data corresponding to the video frames outputted by the target hierarchical module, and the multi-kernel temporal processing module performs, in the time dimension according to the time information of the video frames, convolution processing on the target pixels in the first feature data corresponding to the inputted video frames, to separately obtain corresponding second feature data. Each second feature data includes a time sequence feature representing the moving target in the time dimension. The target hierarchical module is a hierarchical module located at the upper stage of the multi-kernel temporal processing module, and the target pixels are pixels having identical positions in the first feature data outputted by the target hierarchical module.

Figure 3A:
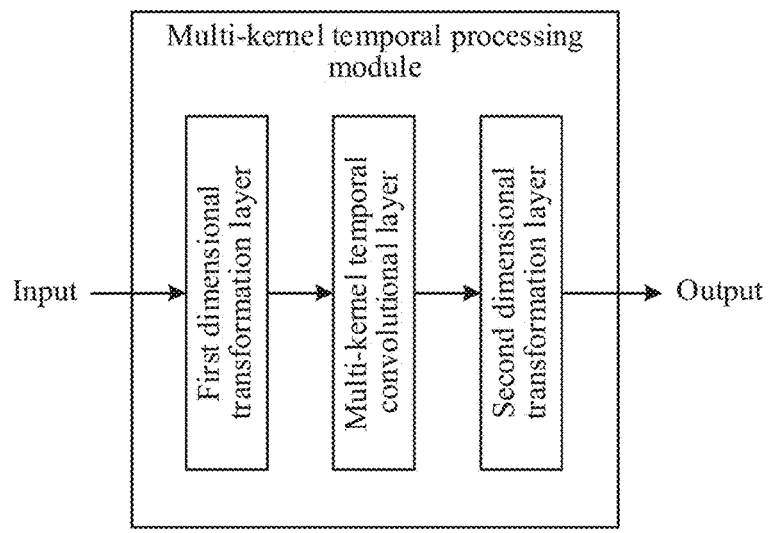
FIG. 3A is a schematic structural diagram of a multi-kernel temporal processing module according to an embodiment of this application.

Referring to FIG. 3A, FIG. 3A is an exemplary diagram of a multi-kernel temporal processing module. One multi-kernel temporal processing module includes at least: a first dimensional transformation layer, a multi-kernel temporal convolutional layer, and a second dimensional transformation layer. The first dimensional transformation layer is configured to determine, according to the time information of the video frames, first temporal feature data which, in the time dimension, corresponds to the target pixels in the first feature data that corresponds to all the video frames and is outputted by the target hierarchical module. The multi-kernel temporal convolutional layer is configured to perform, for each target pixel, convolution processing on the first temporal feature data corresponding to the target pixels, to obtain second temporal feature data. The second dimensional transformation layer is configured to determine, according to corresponding positions of the target pixels in the first feature data in each second temporal feature data, second feature data which, in a spatial dimension, corresponds to pixels having identical time information in all the second temporal feature data.

Figure 4:
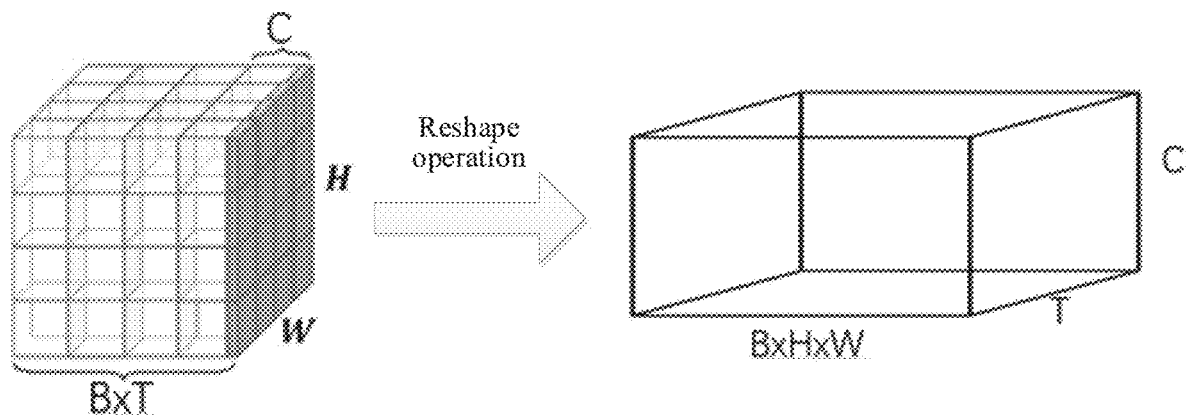
FIG. 4 is a schematic diagram of performing a reshape operation on a first dimensional transformation layer according to an embodiment of this application.

Referring to FIG. 4, the first dimensional transformation layer may implement, by using a reshape operation for the matrix, dimension transformation on the first feature data (B×T, C, H, W) (the first feature data being shown in the left of FIG. 4) outputted by the hierarchical module at an upper stage. That is, a spatial dimension (H, W) in the first feature data (B×T, C, H, W) is merged into a batch processing quantity dimension, and the time dimension T is separated independently, to obtain a three-dimensional matrix (B×H× W, C, T). The first temporal feature data is formed by arranging pixels with the same H, the same W, and the same C in the first feature data (C, H, W) corresponding to the video frames according to a time sequence. Each first temporal feature data includes T data, and the first temporal feature data is a one-dimensional vector formed by the T data. For example, when B=1, T=8, C=64, H=56, and W=56, 1×56×56×64 first temporal feature data (the first temporal feature data being shown in the right of FIG. 4) may be obtained after the reshape operation. Each first temporal feature data includes eight data.

The second dimensional transformation layer may be also configured to perform, by using the reshape operation, dimension transformation on all the second temporal feature data outputted by the multi-kernel temporal convolutional layer, a three-dimensional matrix with a dimension of (B×H×W, C, T) is outputted by the multi-kernel temporal convolutional layer, a time dimension T of the three-dimensional matrix is merged into a batch processing quantity dimension B by using the reshape operation, and the spatial dimension (H, W) is separated independently, to obtain a four-dimensional matrix with a dimension of (B×T, C, H, W). (C, H, W) is the second feature data corresponding to the video frames.

Convolution processing is performed, by using the multi-kernel temporal convolutional layer, on each first temporal feature data outputted by the first dimensional transformation layer, to obtain corresponding second temporal feature data. In some cases, the multi-kernel temporal convolutional layer includes a first preset quantity of one-dimensional convolutional layers with different convolution kernel sizes, and is configured to separately perform, for each first temporal feature data outputted by the first dimensional transformation layer, convolution processing on the first temporal feature data by using the first preset quantity of one-dimensional convolutional layers, to obtain a first preset quantity of feature data with different scales corresponding to each first temporal feature data, and then fuse the first preset quantity of feature data with different scales, to obtain the second temporal feature data corresponding to each first temporal feature data. A manner of fusion may include: adding the first preset quantity of feature data with different scales, to obtain the second temporal feature data corresponding to each first temporal feature data. By setting a plurality of one-dimensional convolutional layers with different convolution kernel sizes, time sequence features with different scales may be extracted from the same first temporal feature data, and a plurality of time sequence features with different scales are fused, to obtain the second temporal feature data, thereby better reserving the time sequence features of the moving target.

In some embodiments, the one-dimensional convolutional layer in the multi-kernel temporal convolutional layer may be a one-dimensional depthwise convolutional layer. A calculation amount can be effectively reduced by using the one-dimensional depthwise convolutional layer, and the processing efficiency of the multi-kernel temporal convolutional layer is improved.

Figure 5:
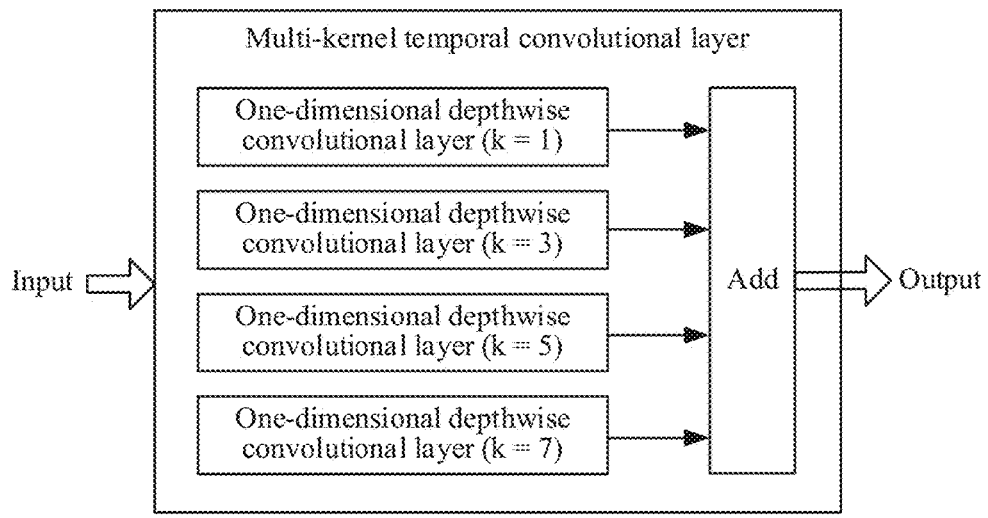
FIG. 5 is a schematic structural diagram of a multi-kernel temporal convolutional layer according to an embodiment of this application.

The multi-kernel temporal convolutional layer shown in FIG. 5 is used as an example. The multi-kernel temporal convolutional layer includes four one-dimensional depthwise convolutional layers with different convolution kernel sizes, and convolution kernels are k=1, k=3, k=5, and k=7 respectively. Convolution processing is separately performed on first temporal feature data by using the four one-dimensional depthwise convolutional layers, to obtain four feature data with different scales corresponding to the first temporal feature data. Then, the four feature data with different scales are added, to obtain second temporal feature data corresponding to the first temporal feature data.

In addition, convolution processing may be alternatively performed, in another convolution manner such as dilated convolution, on each first temporal feature data outputted by the first dimensional transformation layer, to obtain corresponding second temporal feature data.

In some embodiments, a quantity of channels for the first feature data corresponding to the video frames may be reduced from a first value to a second value before the first temporal feature data is determined, thereby reducing the amount of data processed by the multi-kernel temporal processing module and improving the processing efficiency. A quantity of channels for the second feature data is then reset from the second value to the first value after the second feature data is determined.

Figure 3B:
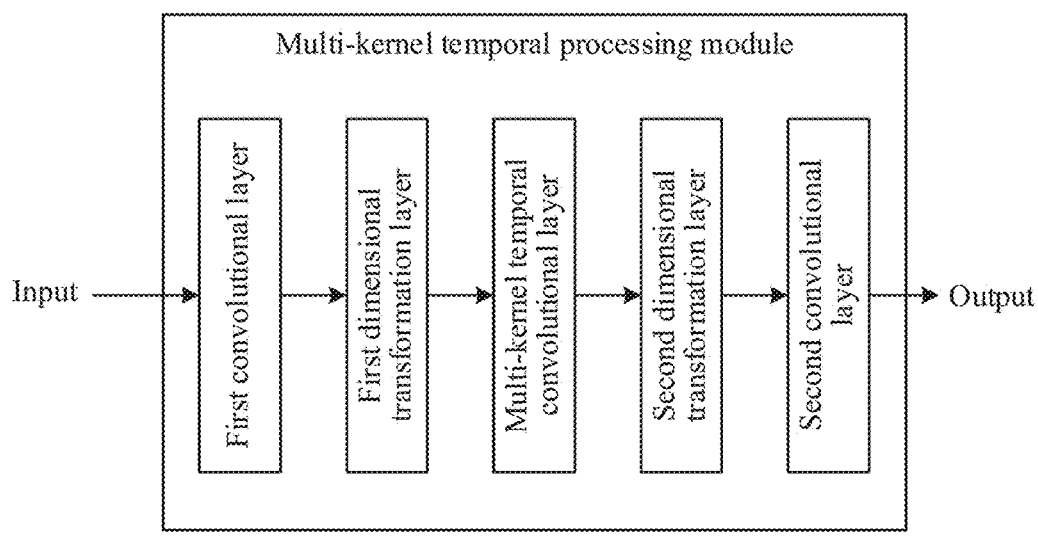
FIG. 3B is a schematic structural diagram of a multi-kernel temporal processing module according to an embodiment of this application.

Referring to FIG. 3B, in this case, the multi-kernel temporal processing module may further include a first convolutional layer and a second convolutional layer. The first convolutional layer is located in front of the first dimensional transformation layer, input data of the first convolutional layer is data (B×T, $C_1$, H, W) outputted by a hierarchical module located at an upper stage of the multi-kernel temporal processing module, convolution processing is performed on (B×T, $C_1$, H, W) by using the first convolutional layer, to obtain (B×T, $C_2$, H, W), and the quantity of channels for the first feature data corresponding to the video frames is reduced from a first value $C_1$ to a second value $C_2$. In this way, the amount of data processed by the multi-kernel temporal processing module can be reduced, and the processing efficiency is improved. The value of $C_2$ may be determined according to the value of $C_1$, for example, $C_2=C_1/4$ or $C_2=C_1/8$. In actual application, a relationship between $C_1$ and $C_2$ may be determined according to system requirements. This is not limited in this embodiment of this application. The second convolutional layer is located behind the second dimensional transformation layer, input data of the second convolutional layer is a matrix (B×T, $C_2$, H, W) formed by the second feature data outputted by the second dimensional transformation layer, convolution processing is performed on (B×T, $C_2$, H, W) by using the second convolutional layer, to obtain (B×T, $C_1$, H, W), and the quantity of channels for the second feature data is reset to the first value $C_1$, to ensure that the dimensions and sizes of the input data and the output data of the multi-kernel temporal processing module are the same. Therefore, the multi-kernel temporal processing module may be easily deployed at any position in the neural network model.

The mean-pooling layer in FIG. 2 is configured to perform mean pooling processing on the feature data outputted by the last-stage hierarchical module, to obtain the motion state feature of the moving target. For example, if the output data of the last-stage hierarchical module is a four-dimensional matrix with a dimension of (B×T, C', H', W'), mean pooling processing may be performed on the four-dimensional matrix by using the mean-pooling layer to reduce a quantity of parameters included in the feature data, to finally obtain a two-dimensional matrix with a dimension of (B×T, C'), that is, the motion state feature of the moving target. C' is a quantity of channels for the feature map, H is a height of the feature map, and W is a width of the feature map.

The first feature data corresponding to the video frames in the video frame sequence is extracted stage by stage by using the hierarchical modules in the neural network model shown in FIG. 2, to obtain the spatial feature representing the moving target in the video frames. In this process, the time sequence feature representing the moving target in the time dimension is extracted by using the multi-kernel temporal processing module disposed between the hierarchical modules, to finally obtain the motion state feature including the spatial feature and the time sequence feature. Therefore, based on the neural network model, more comprehensive feature information can be obtained from the video frame sequence, thereby improving the accuracy of recognizing a moving target.

The neural network model is applicable to a plurality of scenarios. The motion state feature of the moving target in the video is extracted by using the neural network model, and a result of matching between the moving target and the designated target is further obtained based on the extracted motion state feature, to determine whether the video includes the designated target. The designated target may be a person, an animal, a body part (such as a hand or a foot), or the like. Therefore, for different application scenarios, a classification module for a motion state feature may be added behind the neural network model, to directly output the result of matching with the designated target, thereby achieving an end-to-end video processing system.

Figure 6:
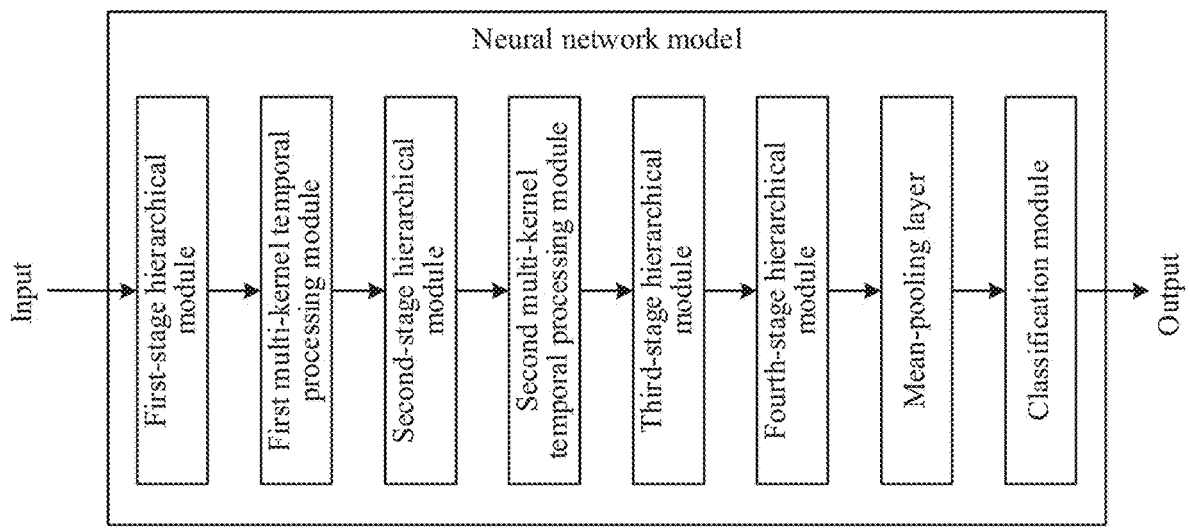
FIG. 6 is a schematic structural diagram of a neural network model applicable to an action recognition scenario according to an embodiment of this application.

The application scenarios shown in FIG. 1A and FIG. 1B are used as an example below. An embodiment of this application further provides a neural network model applicable to an action recognition scenario. Referring to FIG. 6, the neural network model applicable to the action recognition scenario specifically includes: a plurality of hierarchical modules, one or more multi-kernel temporal processing modules, a mean-pooling layer, and a classification module (for example, a classifier). For the functions and layout manners of the hierarchical modules, the multi-kernel temporal processing module, and the mean-pooling layer, reference may be made to the corresponding modules in the neural network model shown in FIG. 2, and the details are not described herein again. The classification module is located behind the mean-pooling layer. The classification module is configured to classify motion state features outputted by the mean-pooling layer, and determine a probability that a moving target pertains to an action category corresponding to each designated target. The classification module may be, for example, a fully connected (FC) layer or a softmax layer.

In actual application, any neural network that can process an image may be used as an underlying network, and the one or more multi-kernel temporal processing modules are inserted into the underlying network, so that a neural network model that can extract a motion state feature of a moving target in a video frame sequence can be obtained. An available underlying network includes, but not limited to, a residual network (ResNet) convolutional neural network (CNN) or a visual geometry group (VGG) network model.

A ResNet50 network is used as an example below to describe a neural network model obtained by using the ResNet50 network as the underlying network.

Figure 7A:
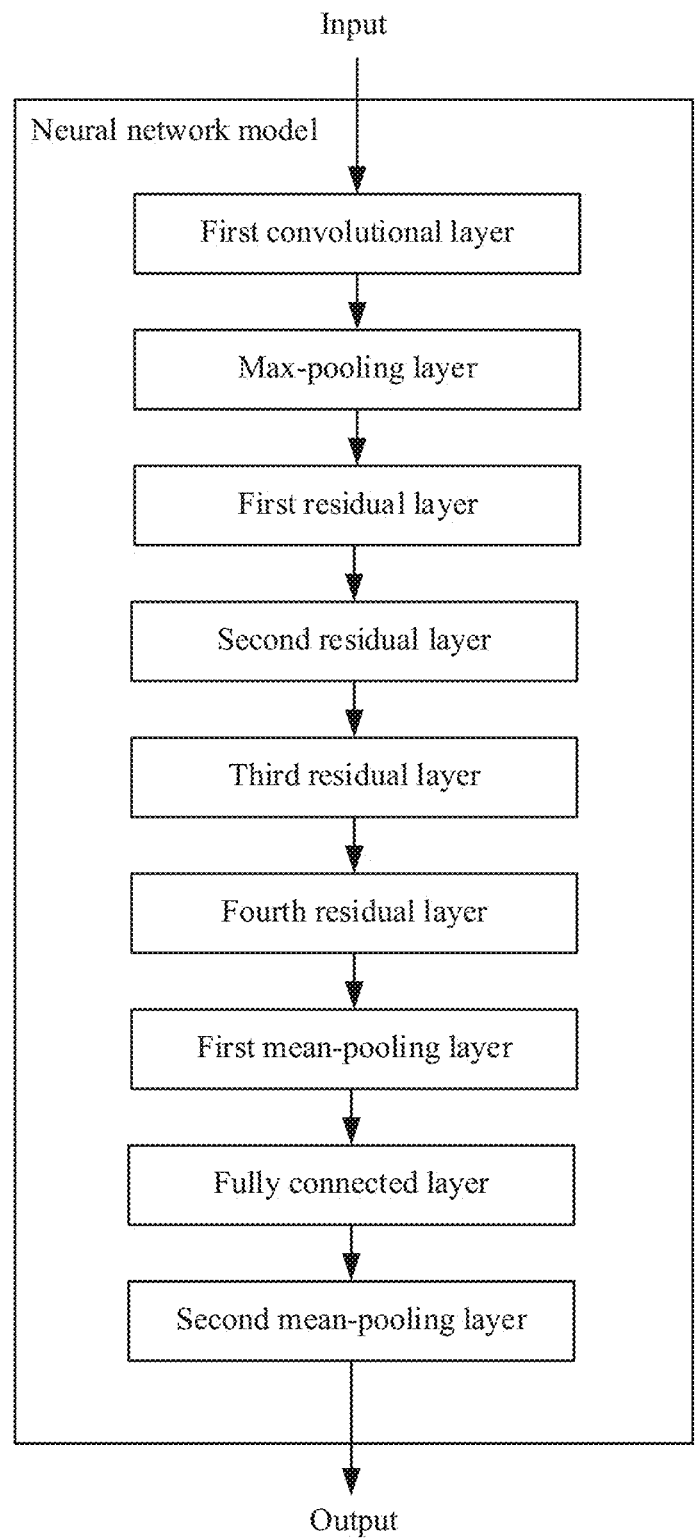
FIG. 7A is a schematic structural diagram of a ResNet50 network.

Referring to FIG. 7A, the ResNet50 network includes a first convolution module, a max-pooling layer, four residual modules, a first mean-pooling layer, a fully connected layer, and a second mean-pooling layer. Each residual layer includes at least one convolutional layer.

Figure 7B:
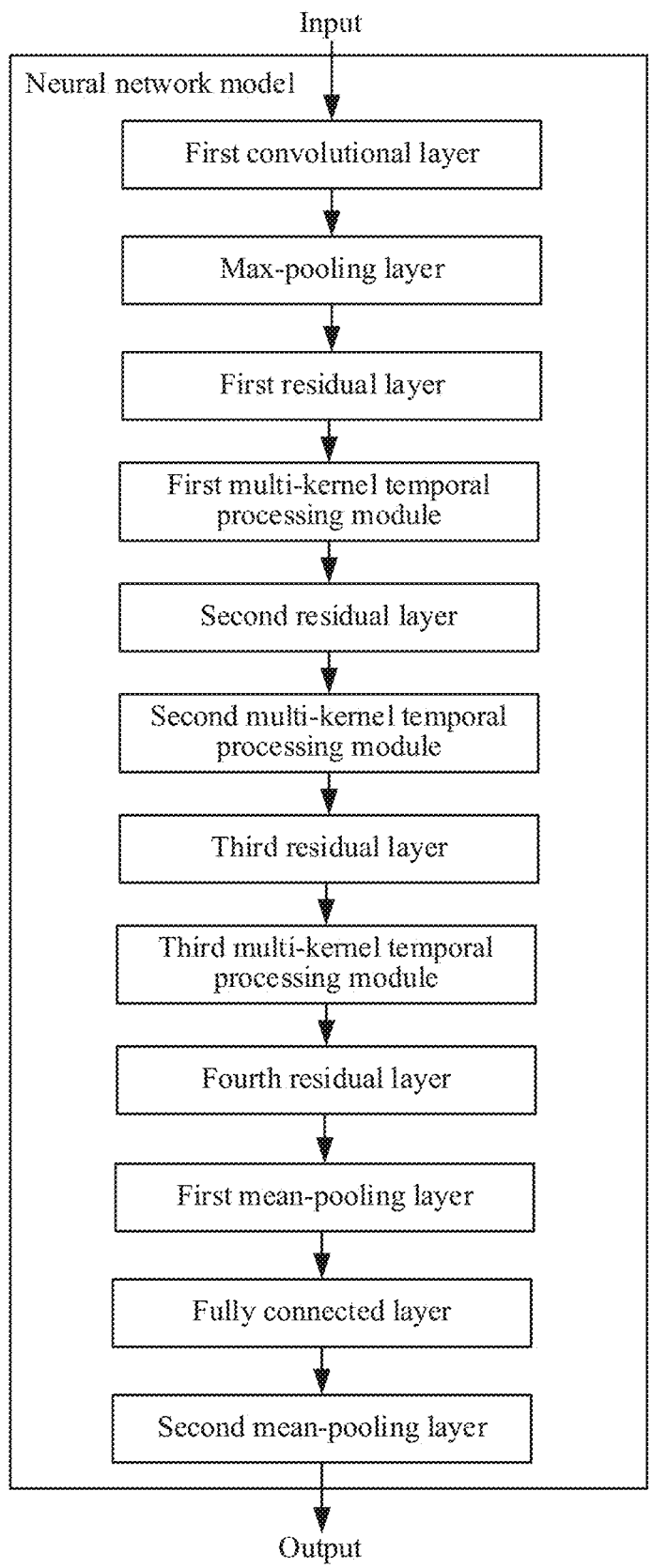
FIG. 7B is a schematic structural diagram of a neural network model obtained by using a ResNet50 network as an underlying network according to an embodiment of this application.

Exemplarily, FIG. 7B shows the neural network model obtained by using the ResNet50 network as the underlying network. In actual application, the positions where the multi-kernel temporal processing modules are inserted and the quantity thereof are not limited to the manner shown in FIG. 7B.

In FIG. 7B, the first convolution module includes a first convolutional layer followed by a batch normalization (BN) layer and a rectified linear unit (ReLU) layer in the ResNet50 network. Input data of the first convolution module is a video frame sequence. The video frame sequence is represented as a four-dimensional matrix, for example, (8, 3, 224, 224). 8 in the first dimension refers to a frame sequence length, 3 in the second dimension refers to three RGB channels, 224 in the third dimension is a height of a single video frame, and 224 in the fourth dimension is a width of the single video frame.

The max-pooling layer is a first max-pooling layer of the ResNet50 network, and after the max-pooling layer is passed through, a space size (that is, a height and a width) of a feature map outputted by the first convolution module is reduced to a half of the space size thereof before the feature map is inputted.

The four residual modules are configured to perform stage-by-stage convolution processing on data outputted by the max-pooling layer, to extract a spatial feature of the moving target in the video frame sequence.

The first mean-pooling layer acts on a spatial dimension, and performs, in the spatial dimension, mean pooling processing on data outputted by the fourth residual modules.

The first mean-pooling layer acts on a time dimension, and performs, in a spatial dimension, mean pooling processing on data outputted by the fully connected layer.

The structures, parameters, and processing procedures corresponding to the network layers and the modules in the ResNet50 network shown in FIG. 7B all remain unchanged.

For example, input information is that the batch processing quantity B=2, the frame sequence length T=8, the quantity of RGB channels C=3, the height H=224, and the width W=224. That is, the video frame sequence inputted to the neural network model is a four-dimensional matrix (2×8, 3, 224, 224).

The ResNet50 network includes the first convolution module, the max-pooling layer, the four residual modules, the first mean-pooling layer, the fully connected layer, and the second mean-pooling layer.

Matrix data with a dimension of (16, 64, 112, 112) is outputted after being processed by the first convolutional layer.

Matrix data with a dimension of (16, 64, 56, 56) is outputted after being processed by the max-pooling layer.

Matrix data with a dimension of (16, 256, 56, 56) is outputted after being processed by the first residual module.

Matrix data with a dimension of (16, 256, 56, 56) is outputted after being processed by the first multi-kernel temporal processing module.

Matrix data with a dimension of (16, 512, 28, 28) is outputted after being processed by the second residual module.

Matrix data with a dimension of (16, 512, 28, 28) is outputted after being processed by the second multi-kernel temporal processing module.

Matrix data with a dimension (16, 1024, 14, 14) is outputted after being processed by the third residual module.

Matrix data with a dimension of (16, 1024, 14, 14) is outputted after being processed by the third multi-kernel temporal processing module.

Matrix data with a dimension of (16, 2048, 7, 7) is outputted after being processed by the third residual module.

Matrix data with a dimension of (16, 2048) is outputted after being processed by the first mean-pooling layer.

Matrix data with a dimension of (16, 249) is outputted after being processed by the fully connected layer. 249 is a total quantity of preset action categories, and the data outputted by the fully connected layer is a probability that video frames pertain to each action category, that is, classification results.

Herein, before the data outputted by the fully connected layer is inputted to the second mean-pooling layer, the reshape operation further needs to be performed on the data outputted by the fully connected layer, to obtain matrix data with a dimension of (2, 8, 249). The reshape operation herein is to separate a time dimension T from a batch dimension, so that the classification results of the video frame are processed in the time dimension by using the second mean-pooling layer, to obtain the probability that each video frame sequence pertains to each action category. Then, matrix data with a dimension of (2, 249) is outputted after being processed by the second mean-pooling layer, to obtain a final classification result, that is, the probability that each video frame sequence pertains to each action category. The batch processing quantity is 2, that is, two independent video frame sequences S1 and S2 are processed currently. The result outputted by the second mean-pooling layer includes a probability that the video frame sequence S1 corresponds to 249 action categories, and a probability that the video frame sequence S2 corresponds to the 249 action categories.

During data processing, the neural network model provided in this embodiment of this application makes full use of the batch dimension in the input data of the neural network, thereby conveniently implementing transformation between the time dimension and the spatial dimension of the matrix data, and merges the time dimension T in the matrix data corresponding to the video frame sequence into the batch processing quantity dimension B, to obtain (B×T, C, H, W), so that the neural network model may perform convolution processing on the video frames in the spatial dimension, and extract the spatial feature from the video frames. The three-dimensional matrix (B×H×W, C, T) is obtained by merging the spatial dimension (H, W) in the matrix data corresponding to the video frame sequence into the batch processing quantity dimension B and separating the time dimension T independently, so that the neural network model may perform convolution processing on the plurality of video frames in the time dimension, and extract the time sequence features from the plurality of video frames, to finally obtain the motion state feature including the spatial feature and the time sequence feature.

Figure 8A:
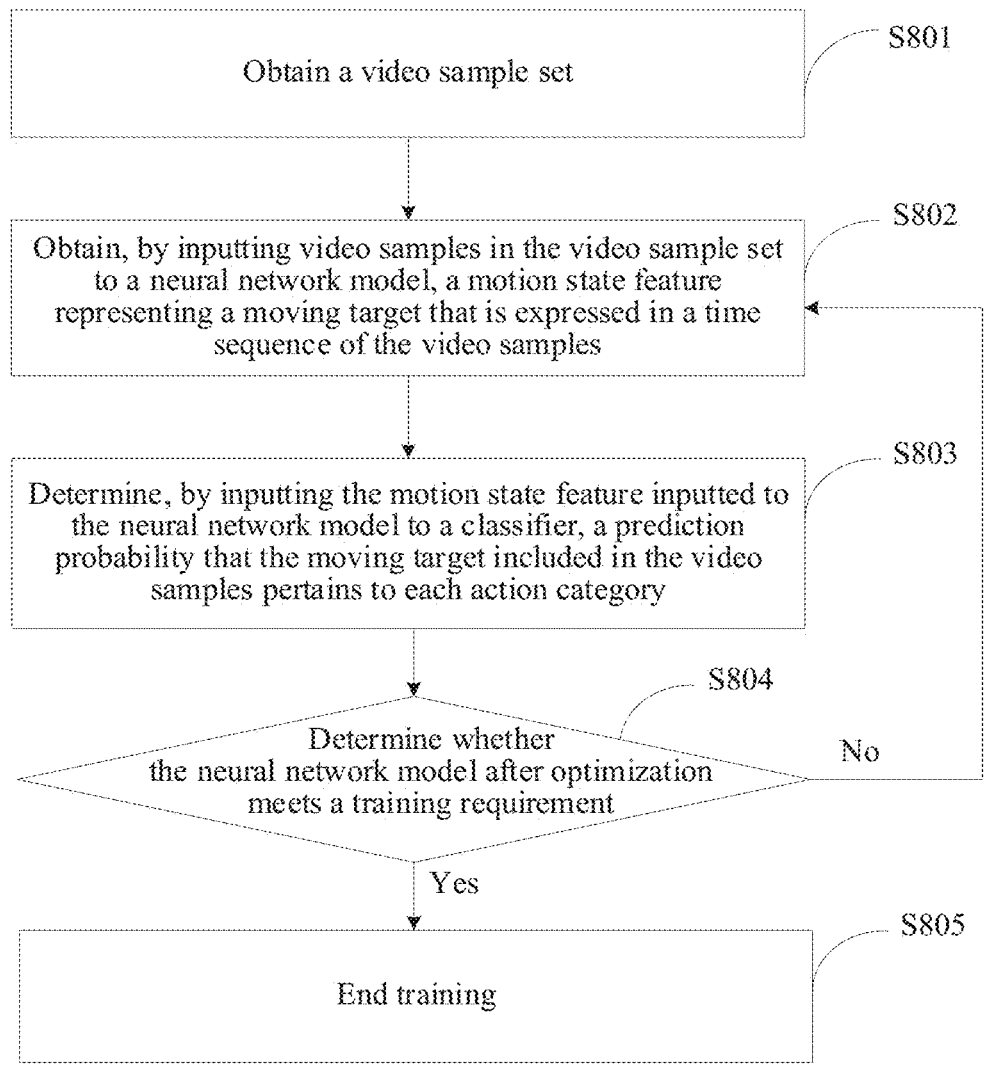
FIG. 8A shows a procedure of training a neural network model according to an embodiment of this application.

FIG. 8A is a schematic diagram of a procedure of training a neural network model. The procedure specifically includes the following steps.

In step S801, a video sample set is obtained.

Each video sample in the video sample set in the foregoing steps includes a video frame sequence marked with a category identifier, the category identifier being used for representing an action category corresponding to a moving target included in the video frame sequence.

The video frame sequence in the video sample set may be a video that includes a third preset quantity of continuous video frames.

Alternatively, the video frame sequence in the video sample set may be an image sequence obtained by arranging, according to a time sequence, a plurality of discontinuous video frames that are captured from a video. For example, one video frame may be extracted from a video every preset quantity of video frames according to a time sequence of the video. In response to a determination that a quantity of extracted video frames reaches a third preset quantity, the third preset quantity of extracted video frames is determined as the video frame sequence. The third preset quantity is determined according to a requirement of the neural network model on input data. That is, the third preset quantity is equal to T. The second preset quantity may be determined according to a length of the video including a complete action and the third preset quantity. For example, if a video corresponding to one action includes 100 frames, and the third preset quantity is 8, one video frame may be extracted every 14 frames starting from the first frame in the video, to finally obtain a video image sequence formed by the $1^{st}$, $15^{th}$, $29^{th}$, $43^{rd}$, $57^{th}$, $71^{st}$, $85^{th}$, and $99^{th}$ frames.

After being obtained, the video sample set may be stored in a database, and may be read directly from the database during training.

In step S802, a motion state feature representing a moving target is expressed in a time sequence of the video samples is obtained, according to the video samples in the video sample set and by using a neural network model.

After the video sample set is obtained, the video samples in the video sample set may be inputted to the neural network model, and the motion state feature is obtained after being processed by the neural network model. The neural network model in the foregoing steps may be any neural network model not including a classification module provided in this embodiment of this application.

The neural network model shown in FIG. 2 is used as an example. The hierarchical modules in the neural network separately extract first feature data corresponding to video frames in video samples from input data stage by stage and output the first feature data, input data of a first-stage hierarchical module including the video samples, and input data of the other stages of hierarchical modules being data outputted by a hierarchical module or a multi-kernel temporal processing module located at an upper stage thereof. The multi-kernel temporal processing module performs, in the time dimension according to time information of the video frames, convolution processing on target pixels in first feature data outputted by a target hierarchical module, to separately obtain corresponding second feature data, each second feature data including a time sequence feature representing the moving target in the time dimension. The mean-pooling layer is configured to perform mean pooling processing on feature data outputted by a last-stage hierarchical module, to obtain the motion state feature of the moving target in the video samples.

In step S803, a prediction probability that the moving target included in the video samples pertains to each action category is determined, according to the motion state feature outputted by the neural network model and by using a classifier.

For the structure of the classifier, reference may be made to the foregoing classification module, and the details will not be described herein again.

In step S804, weight parameters of the neural network model and the classifier are optimized according to the prediction probability and a category identifier.

In step S805, it is determined whether the neural network model after optimization meets a training requirement. If yes, step S806 is performed; otherwise step S802 is returned.

In step S806, training is ended.

In an implementation, a difference between the prediction probability and the category identifier corresponding to the video samples is calculated by using a loss function (for example, a cross entropy loss function), and the weight parameters in the neural network model and the classifier are then updated by using optimization algorithms such as backpropagation (BP), gradient descent (GD) or stochastic gradient descent (SGD). The foregoing step S802 to step S804 are cyclically performed until the probability that the prediction probability corresponding to the video samples obtained based on the neural network model and the classifier is consistent with the category identifier corresponding to the video samples reaches an expected value. In this case, it indicates that the neural network model that meets the requirement has been obtained, and the training may be ended.

The neural network model trained by using the method shown in FIG. 8A may extract a motion state feature of a moving target from a video frame sequence.

Figure 8B:
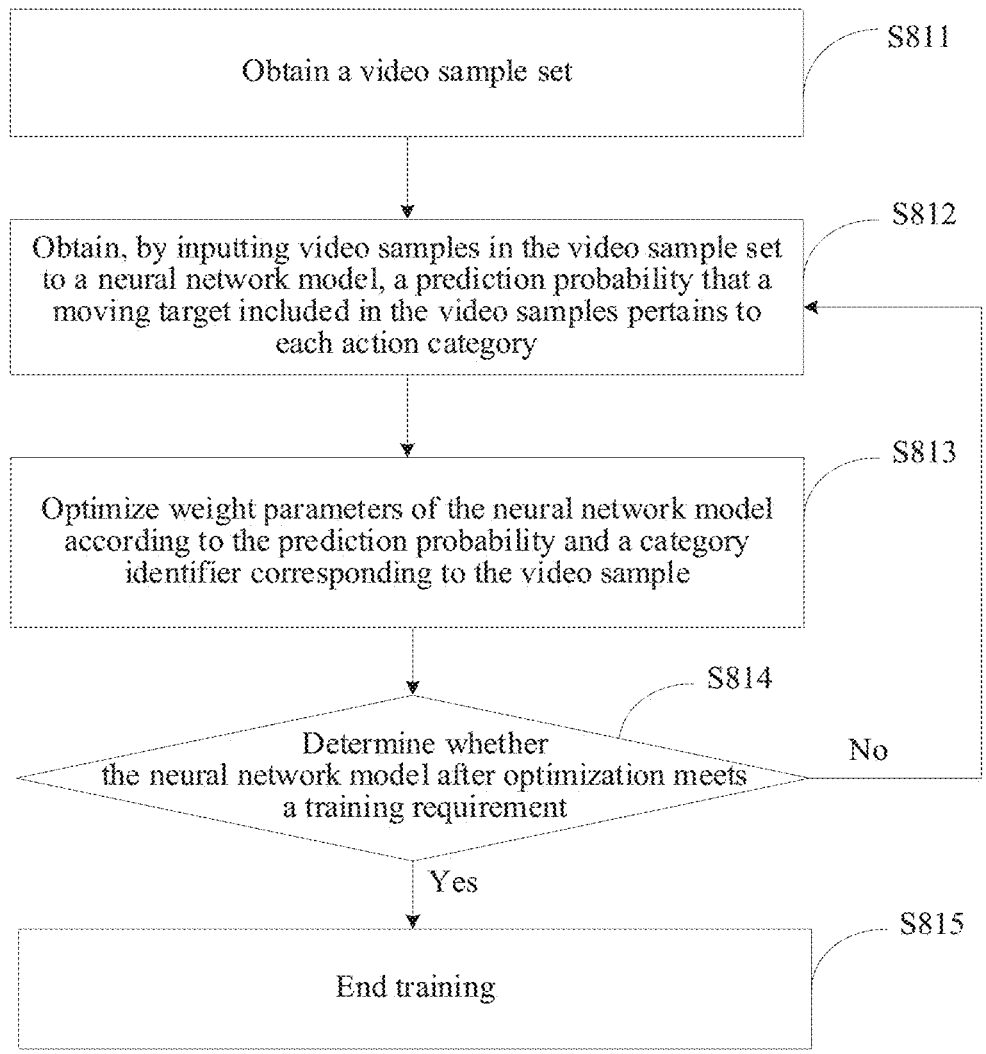
FIG. 8B shows a procedure of training a neural network model according to an embodiment of this application.

FIG. 8B is a schematic diagram of a procedure of training a neural network model. Steps the same as those in FIG. 8A will not be described herein again. The training method shown in FIG. 8B specifically includes the following steps.

In step S811, a video sample set is obtained.

Each video sample in the video sample set in the foregoing steps includes a video frame sequence marked with a corresponding category identifier, the category identifier being used for representing an action category corresponding to a moving target included in the video frame sequence.

In step S812, a prediction probability that a moving target included in the video samples pertains to each action category is obtained, according to the video samples in the video sample set and by using a neural network model.

The neural network model in the foregoing steps may be the neural network model including a classification module provided in this embodiment of this application.

The neural network model shown in FIG. 6 is used as an example. The hierarchical modules in the neural network separately extract first feature data corresponding to video frames in video samples from input data stage by stage and output the first feature data, input data of a first-stage hierarchical module including the video samples, and input data of the other stages of hierarchical modules being data outputted by a hierarchical module or a multi-kernel temporal processing module located at an upper stage thereof. The multi-kernel temporal processing module performs, in the time dimension according to the time information of the video frames, convolution processing on target pixels in first feature data outputted by a target hierarchical module, to separately obtain corresponding second feature data, each second feature data including a time sequence feature representing the moving target in the time dimension. The mean-pooling layer performs mean pooling processing on feature data outputted by a last-stage hierarchical module, to obtain a motion state feature of the moving target in the video samples. The classification module classifies motion state features outputted by the mean-pooling layer, and determines the prediction probability that the moving target pertains to each action category.

In step S813, weight parameters of the neural network model are optimized according to the prediction probability and a category identifier corresponding to the video samples.

In step S814, it is determined whether the neural network model after optimization meets a training requirement. If yes, step S815 is performed; otherwise step S812 is returned.

In step S815, training is ended.

The neural network model trained by using the method shown in FIG. 8B may recognize an action category corresponding to a moving target in a video frame sequence.

Figure 8C:
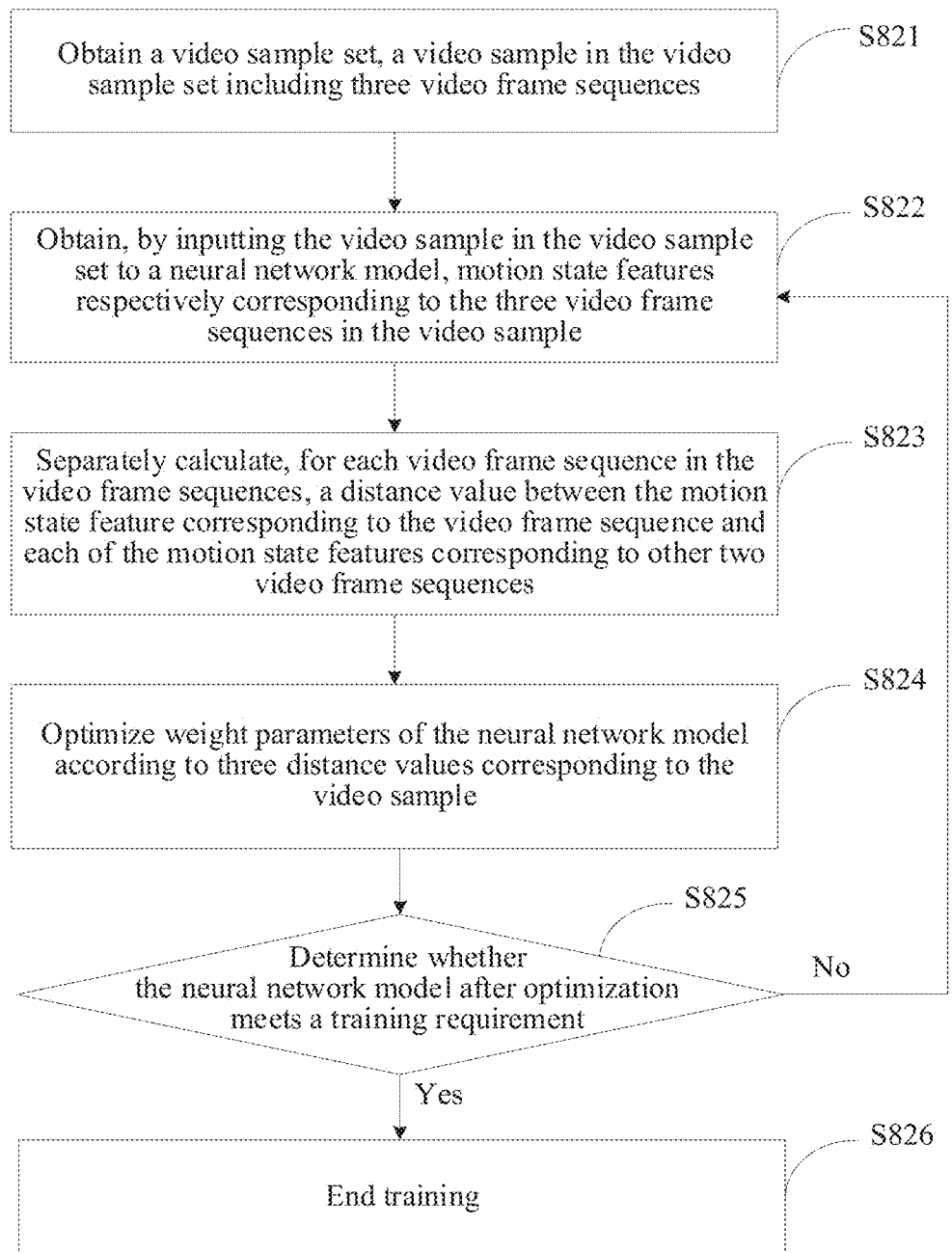
FIG. 8C shows procedure of training a neural network model according to an embodiment of this application.

FIG. 8C is a schematic diagram of a procedure of training a neural network model. Steps the same as those in FIG. 8A will not be described herein again. The training method shown in FIG. 8C specifically includes the following steps.

In step S821, a video sample set is obtained, a video sample in the video sample set including three video frame sequences.

In the foregoing steps, one video sample in the video sample set is a triplet (S1, S2, S3) including three video frame sequences. The video frame sequences S1 and S2 are positive samples. That is, moving targets in the video frame sequences S1 and S2 have the same motion state feature. The video frame sequence S3 is a negative sample, and a motion state feature of a moving target in the video frame sequence S3 differs from both motion state features of the moving targets in other two video frame sequences. For example, for an action recognition scenario, the moving targets in the video frame sequences S1 and S2 perform the same action, while an action performed by the moving target in the video frame sequence S3 is different from those in the first two video frame sequences. For a person ReID scenario, the moving targets in the video frame sequences S1 and S2 are the same person, while the moving target in the video frame sequence S3 is not the same person as that of the moving targets in the first two video frame sequences.

In step S822, motion state features respectively corresponding to the three video frame sequences in the video sample are obtained, according to the video samples in the video sample set and by using a neural network model.

The neural network model in the foregoing steps may be any neural network model not including a classification module provided in this embodiment of this application.

In step S823, a distance value between the motion state feature corresponding to the video frame sequence and each of the motion state features corresponding to other two video frame sequences is separately calculated, for each video frame sequence in the video frame sequences.

In this step, for the triplet (S1, S2, S3), a distance value d1 between the motion state feature corresponding to S1 and the motion state feature corresponding to S2, a distance value d2 between the motion state feature corresponding to S1 and the motion state feature corresponding to S3, and a distance value d3 between the motion state feature corresponding to S2 and the motion state feature corresponding to S3 need to be calculated. Specifically, the distance value between two motion state features may be calculated by using a Euclidean distance algorithm. A smaller value of the distance between the two motion state features indicates a higher similarity between the two motion state features, that is, a higher probability that the moving targets corresponding to the two motion state features perform the same action or are the same person.

In step S824, weight parameters of the neural network model are optimized according to three distance values corresponding to the video sample.

Specifically, the weight parameters of the neural network model may be updated in a batch random gradient descent manner, to minimize the distance d1 between the motion state features corresponding to S1 and S2 in the triplet and maximize the distances d2 and d3. A specific optimization process is not described again.

In step S825, it is determined whether the neural network model after optimization meets a training requirement. If yes, step S826 is performed; otherwise step S822 is returned.

In step S826, training is ended.

The foregoing step S822 to step S825 are circularly performed until the distance value between the motion state features corresponding to the positive samples in the triplet is less than a first value, and the distance value between the motion state features corresponding to the positive sample and the negative sample in the triplet is greater than a second value. The first value and the second value are determined according to a model precision requirement.

In some cases, the neural network model may be alternatively trained by using a method for improving the triplet and a four-tuple, and a specific process is not described again.

The neural network model trained by using the method shown in FIG. 8C may extract a motion state feature of a moving target from a video frame sequence.

For any training method described above, the video sample set may be alternatively divided into a training set, a verification set, and a test set. There is no intersection between the test set and the training set, and there is no intersection between the test set and the verification set. The neural network model is first trained by using the training set, and the weight parameters of the neural network model are optimized. After the neural network model is trained, the neural network model is then tested by using the verification set, to verify whether an output result of the neural network model is accurate. If an accuracy of the output result does not meet a requirement, the neural network model needs to be continuously trained by using the training set. If the accuracy of the output result meets the requirement, the accuracy of the model is verified and tested by using the test set that is not trained. If the test succeeds, it indicates that the training of the neural network is completed.

For different application scenarios, the neural network models applicable to different application scenarios may be obtained by using different video sample sets. During actual application, the neural network model may be trained by using an existing sample set. For example, a neural network model that can recognize sign language is obtained through training by using a sign language dataset such as IsoGD or Jester, a neural network model that can recognize a body action is obtained through training by using an action behavior recognition dataset such as UCF101 or HMDB51, a neural network model applicable to a gesture recognition scenario is obtained through training by using a gesture recognition dataset such as an MSRC-12 Kinect gesture dataset, a neural network model applicable to body pose estimation is obtained through training by using a dataset of body pose estimation such as Human 3.6M, and a neural network model applicable to a person ReID scenario is obtained through training by using a person re-identification dataset such as MARS.

Figure 9:
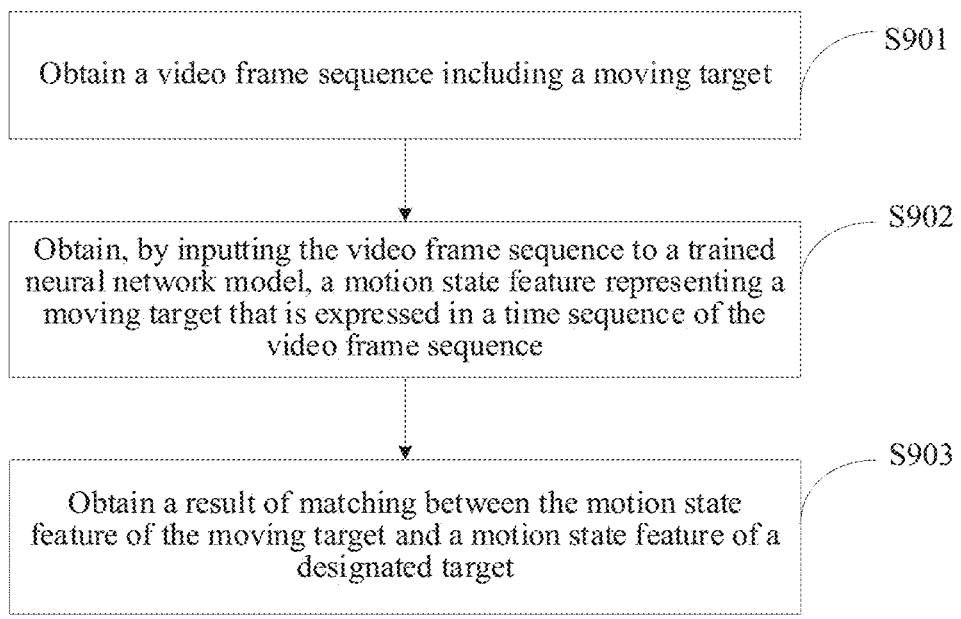
FIG. 9 is a schematic flowchart of a video processing method according to an embodiment of this application.

After the training of the model is completed, the neural network model is applicable to video processing. FIG. 9 is a schematic flowchart of a video processing method according to an embodiment of this application. The method may be, for example, performed by the server shown in FIG. 1A, FIG. 1B, and FIG. 1C, or in an embodiment, may be performed by using the terminal device. The flowchart of the video processing method is described below. Some steps are the same as the corresponding steps in the content of a model description part and the training process, and therefore, the steps are merely briefly described, and for details, reference may be made to the foregoing model description and the description of the corresponding parts in the training method.

In step S901, a video frame sequence including a moving target is obtained.

In some embodiments, the obtaining a video frame sequence including a moving target may be obtained in the following manners: extracting, according to a time sequence of video frames in a video, one video frame from the video every preset quantity of video frames; and determining, in response to a determination that a quantity of extracted video frames reaches a third preset quantity, the third preset quantity of extracted video frames as the video frame sequence.

For example, if the preset quantity is 14, and the third preset quantity is 8, one video frame may be extracted every 14 frames starting from the first frame in video, to finally obtain a first video frame sequence formed by the $1^{st}$, $15^{th}$, $29^{th}$, $43^{rd}$, $57^{th}$, $71^{st}$, $85^{th}$, and $99^{th}$ frames. One video frame may be continuously extracted every 14 frames, to obtain a second video frame sequence.

In step S902, a motion state feature representing a moving target expressed in a time sequence of the video frame sequence is obtained, according to the video frame sequence and by using a trained neural network model.

In step S903, a result of matching between the motion state feature of the moving target and a motion state feature of a designated target is obtained.

In this embodiment of this application, the designated target is determined according to an application scenario. For example, if the application scenario is sign language recognition, the designated target is a hand. If the application scenario is person ReID, the designated target is a person.

The neural network model includes a plurality of hierarchical modules, at least one multi-kernel temporal processing module, and a mean-pooling layer, each multi-kernel temporal processing module in the at least one multi-kernel temporal processing module being disposed between two adjacent hierarchical modules in the plurality of hierarchical modules, and the mean-pooling layer being located behind a last hierarchical module. Step S902 may include separately extracting first feature data corresponding to video frames in the video frame sequence from input data stage by stage by using the hierarchical modules in the neural network model and outputting the first feature data. Each first feature data includes a spatial feature representing the moving target in the video frames, input data of a first-stage hierarchical module including the video frame sequence, and input data of the other stages of hierarchical modules being data outputted by a hierarchical module or a multi-kernel temporal processing module located at an upper stage thereof. Step S902 may also include performing, in the time dimension according to the time information of the video frames and by using the multi-kernel temporal processing module, convolution processing on target pixels in first feature data outputted by a target hierarchical module, to obtain corresponding second feature data. Each second feature data includes a time sequence feature representing the moving target in the time dimension, the target hierarchical module being a hierarchical module located at an upper stage of the multi-kernel temporal processing module, and the target pixels being pixels having identical positions in the first feature data outputted by the target hierarchical module. Step S902 may also include performing, by using the mean-pooling layer, mean pooling processing on feature data outputted by a last-stage hierarchical module, to obtain the motion state feature of the moving target.

Figure 10:
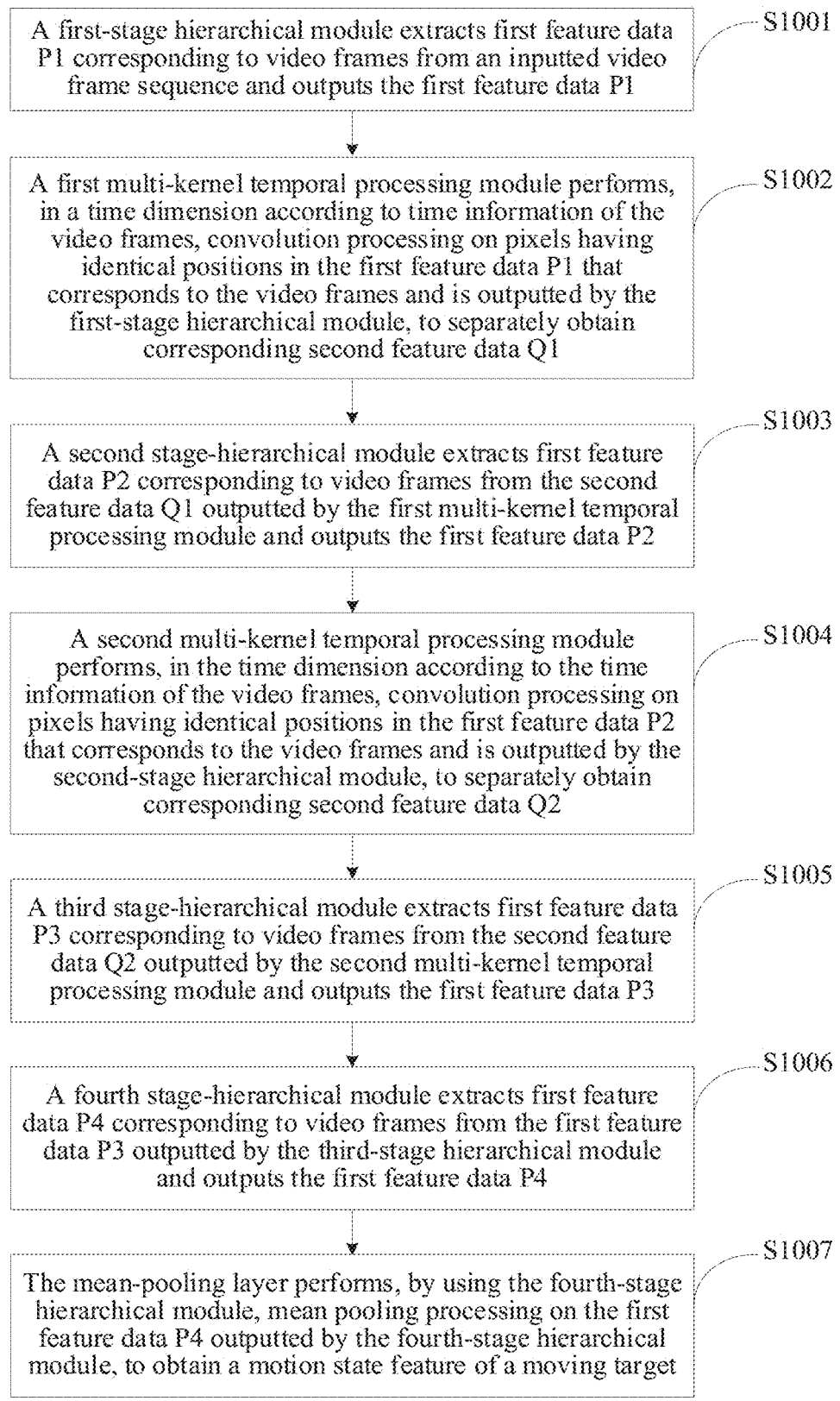
FIG. 10 is a schematic flowchart of determining a motion state feature by using a trained neural network model according to an embodiment of this application.

Referring to FIG. 10, the neural network model shown in FIG. 2 is used as an example. Step S902 may include the following steps.

In step S1001, a first-stage hierarchical module extracts first feature data P1 corresponding to video frames from an inputted video frame sequence and outputs the first feature data P1.

In step S1002, a first multi-kernel temporal processing module performs, in a time dimension according to time information of the video frames, convolution processing on target pixels in first feature data P1 that corresponds to the video frames and is outputted by the first-stage hierarchical module, to obtain corresponding second feature data Q1.

In step S1003, a second stage-hierarchical module extracts first feature data P2 corresponding to video frames from the second feature data Q1 outputted by the first multi-kernel temporal processing module and outputs the first feature data P2.

In step S1004, a second multi-kernel temporal processing module performs, in the time dimension according to the time information of the video frames, convolution processing on pixels having identical positions in the first feature data P2 that corresponds to the video frames and is outputted by the second-stage hierarchical module, to separately obtain corresponding second feature data Q2.

In step S1005, a third stage-hierarchical module extracts first feature data P3 corresponding to video frames from the second feature data Q2 outputted by the second multi-kernel temporal processing module and outputs the first feature data P3.

In step S1006, a fourth stage-hierarchical module extracts first feature data P4 corresponding to video frames from the first feature data P3 outputted by the third-stage hierarchical module and outputs the first feature data P4.

In step S1007, the mean-pooling layer performs, by using the fourth-stage hierarchical module, mean pooling processing on the first feature data P4 outputted by the fourth-stage hierarchical module, to obtain a motion state feature of a moving target.

Figure 11:
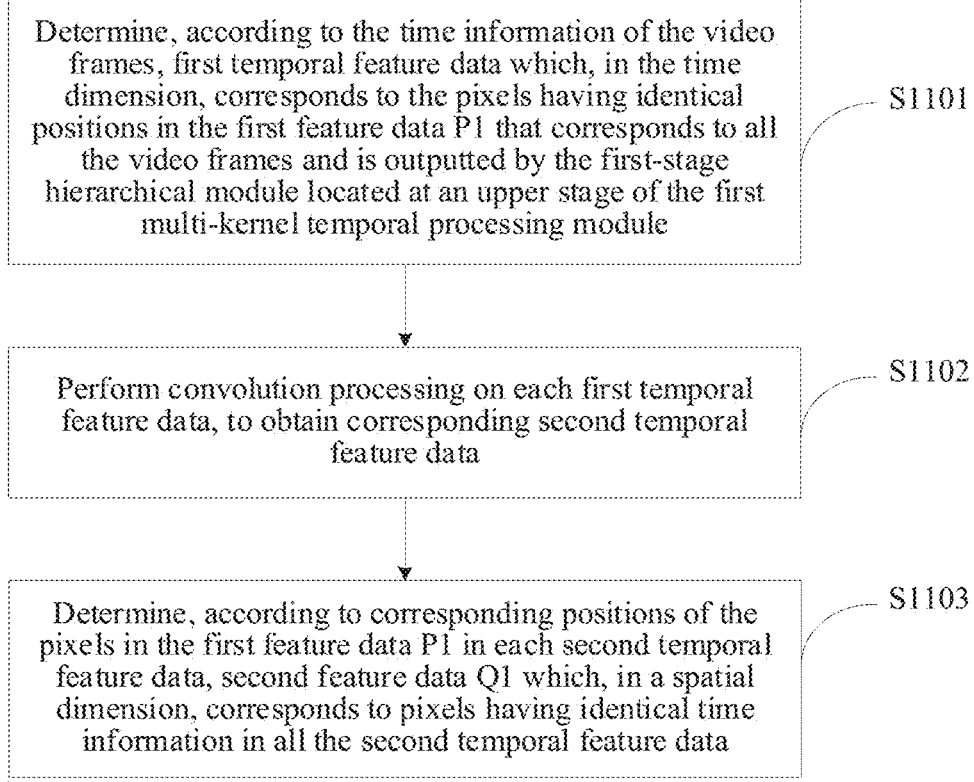
FIG. 11 is a schematic flowchart of determining second feature data by using a multi-kernel temporal processing module according to an embodiment of this application.

In an implementation, the multi-kernel temporal processing module shown in FIG. 3A is used as an example. Referring to FIG. 11, step S1002 may include the following steps.

In step S1101, first temporal feature data is determined, according to the time information of the video frames. The first temporal feature data corresponds, in the time dimension, to the target pixels in the first feature data P1 that corresponds to all the video frames and is outputted by the first-stage hierarchical module located at an upper stage of the first multi-kernel temporal processing module.

The foregoing step S1101 may be implemented by using the first dimensional transformation layer in the multi-kernel temporal processing module.

In step S1102, convolution processing is performed on each first temporal feature data, to obtain corresponding second temporal feature data.

The foregoing step S1101 may be implemented by using the multi-kernel temporal convolutional layer in the multi-kernel temporal processing module.

In step S1103, second feature data Q1 is determined according to corresponding positions of the pixels in the first feature data P1 in each second temporal feature data. The second feature data Q1 corresponds, in a spatial dimension, to pixels having identical time information in all the second temporal feature data.

The foregoing step S1103 may be implemented by using the second dimensional transformation layer in the multi-kernel temporal processing module.

A specific implementation of the foregoing step S1004 is similar to that of step S1002, and is not described again.

Figure 12:
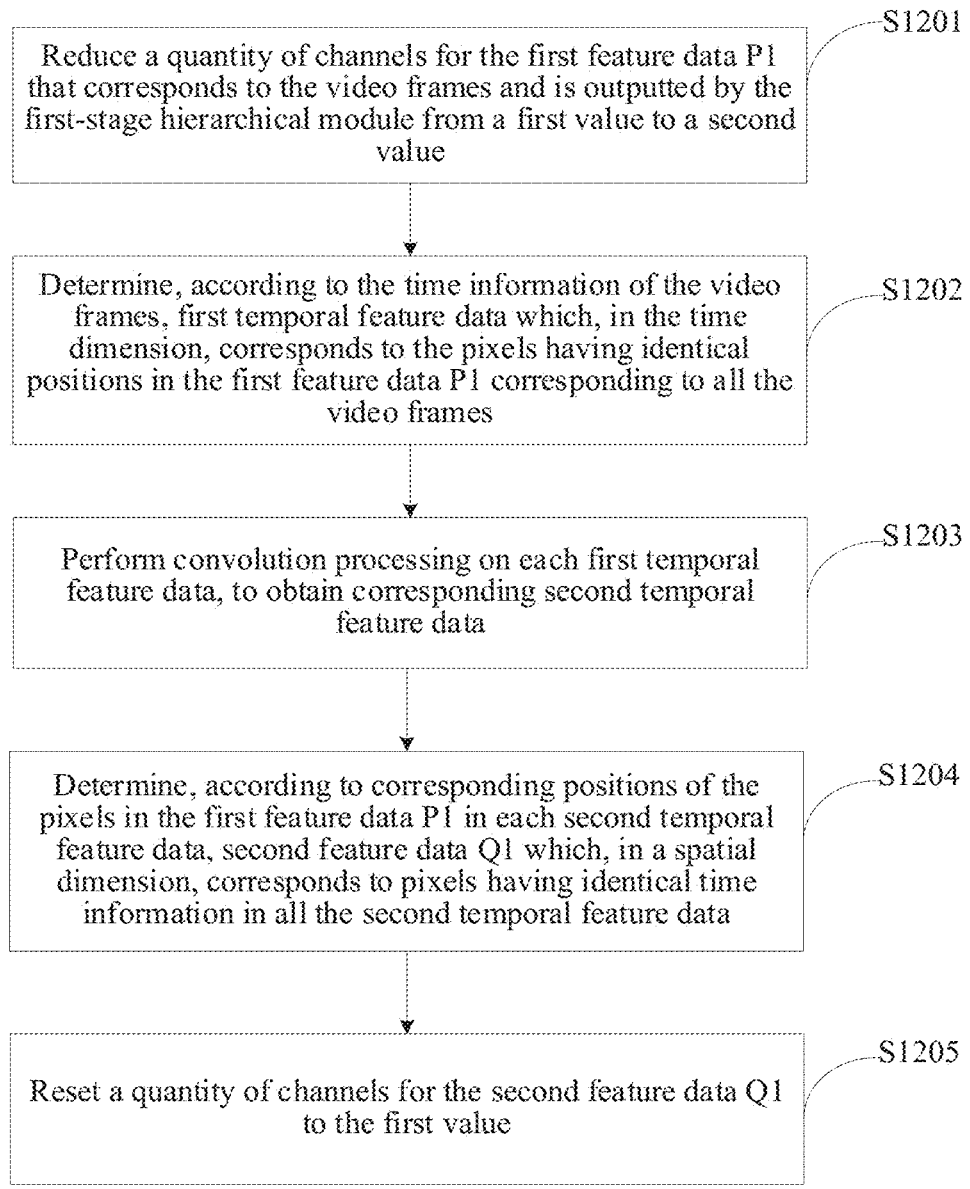
FIG. 12 is a schematic flowchart of determining second feature data by using a multi-kernel temporal processing module according to an embodiment of this application.

In an implementation, the multi-kernel temporal processing module shown in FIG. 3B is used as an example. Referring to FIG. 12, step S1002 may include the following steps.

In step S1201, a quantity of channels for the first feature data P1 that corresponds to the video frames and is outputted by the first-stage hierarchical module is reduced from a first value to a second value.

The foregoing step S1201 may be implemented by using the first convolutional layer in the multi-kernel temporal processing module.

In step S1202, first temporal feature data is determined, according to the time information of the video frames. The first temporal feature data corresponds, in the time dimension, to the target pixels in the first feature data P1 corresponding to all the video frames.

The foregoing step S1202 may be implemented by using the first dimensional transformation layer in the multi-kernel temporal processing module.

In step S1203, convolution processing is performed on each first temporal feature data, to obtain corresponding second temporal feature data.

The foregoing step S1203 may be implemented by using the multi-kernel temporal convolutional layer in the multi-kernel temporal processing module.

In step S1204, second feature data Q1 is determined, according to corresponding positions of the pixels in the first feature data P1 in each second temporal feature data. The second feature data Q1 corresponds, in a spatial dimension, to pixels having identical time information in all the second temporal feature data.

The foregoing step S1204 may be implemented by using the second dimensional transformation layer in the multi-kernel temporal processing module.

In step S1205, a quantity of channels for the second feature data Q1 is reset from the second value to the first value.

The foregoing step S1205 may be implemented by using the second convolutional layer in the multi-kernel temporal processing module.

A specific implementation of the foregoing step S1004 is similar to that of step S1002, and is not described again.

Based on any of the foregoing embodiments, convolution processing may be performed on each first temporal feature data in the following manners. The manners, for example, include the following steps: separately performing, for each first temporal feature data, convolution processing on the first temporal feature data by using a first preset quantity of one-dimensional convolutional layers with different convolution kernel sizes, to obtain a first preset quantity of feature data with different scales; and fusing the first preset quantity of feature data with different scales corresponding to the first temporal feature data, to obtain the second temporal feature data corresponding to the first temporal feature data.

The one-dimensional convolutional layer may be a one-dimensional depthwise convolutional layer. A calculation amount can be effectively reduced by using the one-dimensional depthwise convolutional layer, and the processing efficiency of the multi-kernel temporal convolutional layer is improved.

For the action recognition scenario shown in FIG. 1A and FIG. 1B, step S903 may include: obtaining, according to the motion state feature of the moving target and by using a trained classifier, a probability that the moving target pertains to an action category corresponding to each designated target, the classifier being obtained through training according to the motion state feature of the designated target.

For the method for training the classifier, reference may be made to related content in the method for training the neural network model.

For an action recognition scenario, a neural network model including a classification module may be alternatively directly used, to obtain the probability that a moving target in a video frame sequence pertains to an action category corresponding to each designated target. For the specific structure, reference may be made to the neural network model shown in FIG. 6 or FIG. 7B.

For the target recognition tracking scenario shown in FIG. 1C, step S903 may include: determining the moving target as the designated target in response to a determination that a similarity between the motion state feature of the moving target and the motion state feature of the designated target is greater than a threshold.

In some embodiments, the distance value between the motion state feature of the moving target and the motion state feature of the designated target may be calculated by using the Euclidean distance algorithm and be used as the similarity.

In response to a determination that the similarity between the motion state feature of the moving target and the motion state feature of the designated target is not greater than the threshold, it is determined that the video frame sequence does not include the designated target.

In the video processing method in this embodiment of this application, the motion state feature representing the moving target that is expressed in the time sequence of the video frame sequence may be obtained by using the neural network model. The motion state feature not only includes the spatial feature of the moving target in the video frames extracted by using the hierarchical modules, but also includes the time sequence feature representing the moving target in the time dimension extracted by using the multi-kernel temporal processing module. That is, more comprehensive feature information can be obtained from the video frame sequence, thereby improving the accuracy of recognizing a moving target.

Figure 13:
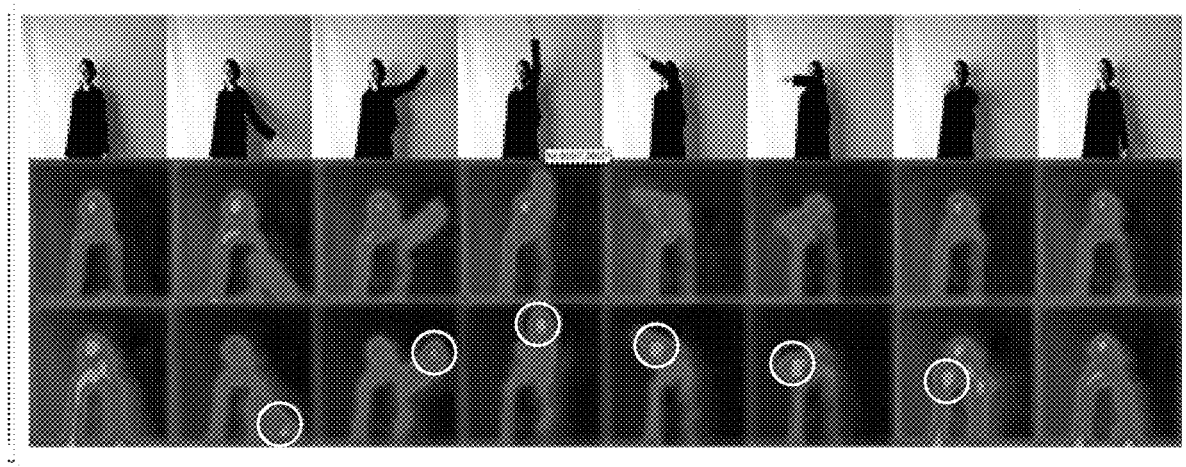
FIG. 13 shows a visual analysis result of an intermediate result obtained by a neural network model.

FIG. 13 shows a result of a visual analysis on an intermediate result obtained by a neural network model. The first row of images are an inputted video frame sequence, the second row of images are visual images corresponding to data outputted by a second residual layer of a first model, and the third row of images are visual images corresponding to data outputted by a second residual layer of a second model. The first model is a model obtained by training the model shown in FIG. 7A by using a sign language dataset, and the second model is a model obtained by training the model shown in FIG. 7B by using the sign language dataset. The visualization process, for example, may include: calculating, for a plurality of feature maps corresponding to each video frame, mean square values of the feature maps along a channel direction, to obtain a visual image corresponding to each video frame, a pixel with a larger mean square value being corresponding to a stronger brightness response. It can be learned from FIG. 13 that, the feature map obtained by using the video processing method in this embodiment of this application has a stronger response to the hand (for example, the position marked by a white circle in FIG. 13, which represents the response of the feature map to the hand). This is very important for the sign language recognition, and moreover, the temporal continuity of a hand area can be better reflected. Therefore, by using the video processing method in this embodiment of this application, feature information of the hand in time and space can be enhanced, thereby improving the recognition accuracy of the sign language recognition.

Figure 14:
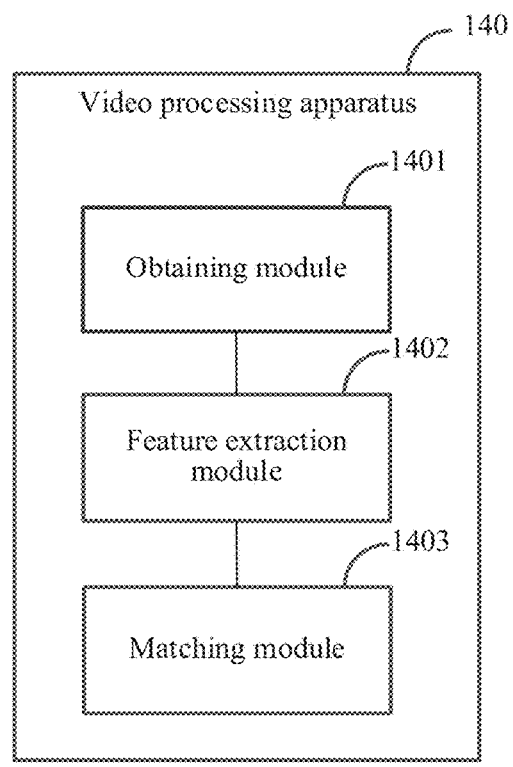
FIG. 14 is a schematic structural diagram of a video processing apparatus according to an embodiment of this application.

As shown in FIG. 14, based on the foregoing video processing method, an embodiment of this application further provides a video processing apparatus 140, including an obtaining module 1401, a feature extraction module 1402, and a matching module 1403. One or more of the modules can be implemented by processing circuitry, software, or a combination thereof, for example.

The obtaining module 1401 is configured to obtain a video frame sequence including a moving target.

The feature extraction module 1402 is configured to obtain, according to the video frame sequence and by using a trained neural network model, a motion state feature representing the moving target, the motion state feature being expressed in a time sequence of the video frame sequence.

The matching module 1403 is configured to obtain a result of matching between the motion state feature of the moving target and a motion state feature of a designated target.

In an embodiment, the neural network model includes a plurality of hierarchical modules, at least one multi-kernel temporal processing module, and a mean-pooling layer, each multi-kernel temporal processing module in the at least one multi-kernel temporal processing module being disposed between two adjacent hierarchical modules in the plurality of hierarchical modules, and the mean-pooling layer being located behind a last hierarchical module. Correspondingly, the feature extraction module 1402 is specifically configured to separately extract first feature data corresponding to video frames in the video frame sequence from input data stage by stage by using the hierarchical modules and output the first feature data, each first feature data including a spatial feature representing the moving target in the video frames. Input data of a first-stage hierarchical module includes the video frame sequence, and input data of the other stages of hierarchical modules is data outputted by a hierarchical module or a multi-kernel temporal processing module located at an upper stage thereof. The feature extraction module 1402 is also configured to perform, in a time dimension according to time information of the video frames and by using the multi-kernel temporal processing module, convolution processing on target pixels in first feature data outputted by a target hierarchical module, to separately obtain corresponding second feature data. Each second feature data includes a time sequence feature representing the moving target in the time dimension, the target hierarchical module is a hierarchical module located at an upper stage of the multi-kernel temporal processing module, and the target pixels being pixels having identical positions in the first feature data outputted by the target hierarchical module. The feature extraction module 1402 is also configured to perform, by using the mean-pooling layer, mean pooling processing on feature data outputted by a last-stage hierarchical module, to obtain the motion state feature of the moving target.

In an embodiment, the feature extraction module 1402 is specifically configured to: determine, according to the time information of the video frames, first temporal feature data which, in the time dimension, corresponds to the target pixels in the first feature data outputted by the target hierarchical module. The feature extraction module 1402 is also configured to perform convolution processing on each first temporal feature data, to obtain corresponding second temporal feature data, and determine, according to corresponding positions of the target pixels in the first feature data in each second temporal feature data, second feature data which, in a spatial dimension, corresponds to pixels having identical time information in all the second temporal feature data.

In an embodiment, the feature extraction module 1402 is specifically configured to: separately perform, for each first temporal feature data, convolution processing on the first temporal feature data by using a first preset quantity of one-dimensional convolutional layers with different convolution kernel sizes, to obtain a first preset quantity of feature data with different scales; and fuse the first preset quantity of feature data with different scales, to obtain the second temporal feature data corresponding to the first temporal feature data.

In an embodiment, each of the one-dimensional convolutional layers is a one-dimensional depthwise convolutional layer.

In an embodiment, the feature extraction module 1402 is further configured to: reduce a quantity of channels for the first feature data corresponding to the video frames from a first value to a second value before the first temporal feature data is determined; and reset a quantity of channels for the second feature data from the second value to the first value after the second feature data is determined.

In an embodiment, the obtaining module 1401 is specifically configured to: extract, according to a time sequence of video frames in a video, one video frame from the video every second preset quantity of video frames; and determine, in response to a determination that a quantity of extracted video frames reaches a third preset quantity, the third preset quantity of extracted video frames as the video frame sequence.

In an embodiment, the matching module 1403 is specifically configured to: determine the moving target as the designated target in response to a determination that a similarity between the motion state feature of the moving target and the motion state feature of the designated target is greater than a threshold; or obtain, according to the motion state feature of the moving target and by using a trained classifier, a probability that the moving target pertains to an action category corresponding to each designated target, the classifier being obtained through training according to the motion state feature of the designated target.

In an embodiment, the video processing apparatus in this embodiment of this application further includes a training module. The training module is configured to train the neural network model by obtaining a video sample set, each video sample in the video sample set including a video frame sequence marked with a category identifier. The category identifier is used for representing an action category corresponding to a moving target included in the video frame sequence. The neural network model is further trained by obtaining, according to the video samples in the video sample set and by using the neural network model, a motion state feature representing the moving target that is expressed in a time sequence of the video samples. The neural network model is further trained by determining, according to the motion state feature and by using a classifier, a prediction probability that the moving target included in the video samples pertains to each action category, and optimizing weight parameters of the neural network model and the classifier according to the prediction probability and the category identifier.

In an embodiment, the neural network model includes a plurality of hierarchical modules, at least one multi-kernel temporal processing module, and a mean-pooling layer, each multi-kernel temporal processing module in the at least one multi-kernel temporal processing module being disposed between two adjacent hierarchical modules in the plurality of hierarchical modules, and the mean-pooling layer being located behind a last hierarchical module.

The obtaining, according to the video samples in the video sample set and by using the neural network model, a motion state feature representing the moving target that is expressed in a time sequence of the video samples specifically includes separately extracting first feature data corresponding to video frames in the video samples from the input data stage by stage by using the hierarchical modules and outputting the first feature data. Each first feature data includes a spatial feature representing the moving target, included in the video samples, in the video frames, input data of a first-stage hierarchical module including the video samples, and input data of the other stages of hierarchical modules being data outputted by a hierarchical modules or a multi-kernel temporal processing module located at an upper stage thereof. The obtaining the motion state feature also includes performing, in the time dimension according to the time information of the video frames and by using the multi-kernel temporal processing module, convolution processing on target pixels in first feature data outputted by a target hierarchical module, to obtain corresponding second feature data. Each second feature data includes a time sequence feature representing the moving target in the time dimension, and performing, by using the mean-pooling layer, mean pooling processing on the feature data outputted by the last-stage hierarchical module, to obtain the motion state feature of the moving target in the video samples.

The video processing apparatus provided in this embodiment of this application and the foregoing video processing method use the same concept, and the same beneficial effects can be obtained. Details are not described herein again.

Figure 15:
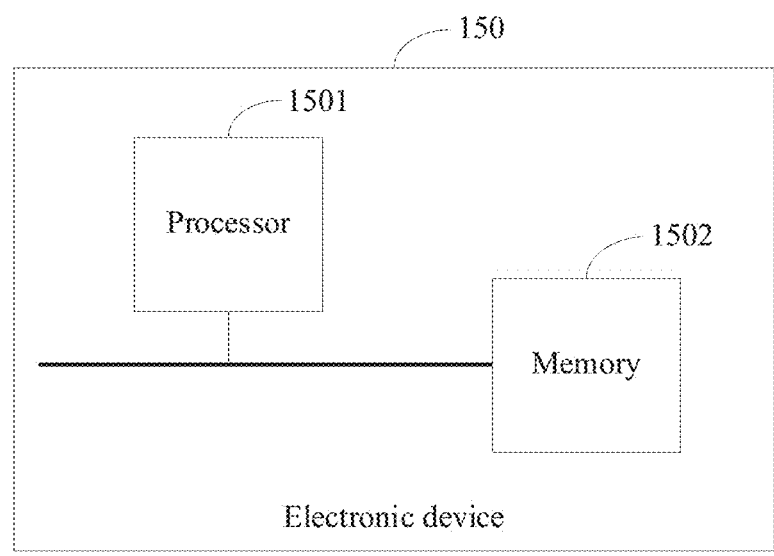
FIG. 15 is a schematic structural diagram of an electronic device according to an embodiment of this application.

Based on the same concept as that of the foregoing video processing method, an embodiment of this application further provides an electronic device. The electronic device may be specifically a terminal device (such as a desktop computer, a portable computer, a smartphone, a tablet computer, or a personal digital assistant (PDA)), or may be an external device that communicates with a terminal device, for example, a server. As shown in FIG. 15, the electronic device 150 may include a processor 1501 and a memory 1502.

The processor 1501 may be a general purpose processor, for example processing circuitry such as a central processing unit (CPU), a digital signal processor (DSP), an application-specific integrated circuit (ASIC), a field programmable gate array (FPGA), another programmable logic device, a discrete gate, a transistor logic device, or a discrete hardware component, and may implement or perform the methods, steps, and logical block diagrams disclosed in the embodiments of this application. The general purpose processor may be a microprocessor, any conventional processor, or the like. Steps of the methods disclosed with reference to the embodiments of this application may be directly performed and completed by a hardware processor, or may be performed and completed by using a combination of hardware and a software module in the processor.

The memory 1502, as a non-transitory computer-readable storage medium, may be configured to store a non-transitory software program, a non-transitory computer-executable program and a module. The memory may include at least one type of storage media, for example, may include: a flash memory, a hard disk, a multimedia card, a card type memory, a random access memory (RAM), a static random access memory (SRAM), a programmable read-only memory (PROM), a read-only memory (ROM), an electrically erasable programmable read-only memory (EEPROM), a magnetic memory, a magnetic disk, an optical disc, and the like. The memory is any other medium that can carry or store expected program code in a form of an instruction or a data structure and can be accessed by a computer, but is not limited thereto. The memory 1502 according to this embodiment of this application may be further a circuit or any other apparatus that can implement a storage function, and is configured to store program instructions and/or data.

An embodiment of this application provides a computer-readable storage medium, configured to store computer program instructions used by the foregoing electronic device, and including a program for performing the foregoing video processing method.

The foregoing computer-readable storage medium may be any computer-accessible usable medium or a data storage device, includes but not limited to: a magnetic memory (for example, a floppy disk, a hard disk, a magnetic tape, or a magneto-optical (MO) disk), an optical memory (for example, a CD, a DVD, a BD, or an HVD), and a semiconductor memory (for example, a ROM, an EPROM, an EEPROM, a non-volatile memory (NAND FLASH), or a solid-state disk (SSD)).

The foregoing embodiments are merely used for describing the technical solutions of this application. The descriptions of the foregoing embodiments are merely intended to help understand the methods of the embodiments of this application, and are not to be construed as a limitation on the embodiments of this application. Any variation or replacement readily figured out by a person skilled in the art is to fall within the protection scope of the embodiments of this application.

What is claimed is:

1. A video processing method, comprising:
    obtaining a video frame sequence comprising a moving target;
    obtaining, according to the video frame sequence and by processing circuitry of a neural network model, a motion state feature representing the moving target, the motion state feature being expressed in a time sequence of the video frame sequence; and
    obtaining a result of matching between the motion state feature of the moving target and a motion state feature of a designated target, wherein the obtaining the result of the matching further comprises:
        determining the moving target as the designated target in response to a determination that a similarity between the motion state feature of the moving target and the motion state feature of the designated target is greater than a threshold; or
        obtaining, according to the motion state feature of the moving target and by using a classifier, a probability that the moving target pertains to an action category corresponding to the designated target, the classifier being obtained through training according to the motion state feature of the designated target.

2. The method according to claim 1, wherein the neural network model comprises a plurality of hierarchical modules, at least one multi-kernel temporal processing module, a mean-pooling layer, each multi-kernel temporal processing module of the at least one multi-kernel temporal processing module being disposed between two adjacent hierarchical modules in the plurality of hierarchical modules, and the mean-pooling layer being located behind a last hierarchical module; and
    the obtaining, according to the video frame sequence and by using the neural network model, the motion state feature comprises:
    extracting first feature data corresponding to video frames in the video frame sequence from input data stage by stage by using the hierarchical modules and outputting the first feature data, the first feature data comprising a spatial feature representing the moving target in the video frames, input data of a first-stage of the hierarchical modules comprising the video frame sequence, and input data of other stages of hierarchical modules being data outputted by a hierarchical module or a multi-kernel temporal processing module located at an upper stage thereof;
    performing, in a time dimension according to time information of the video frames and by using the multi-kernel temporal processing module, convolution processing on target pixels in first feature data outputted by a target hierarchical module, to obtain corresponding second feature data, each second feature data comprising a time sequence feature representing the moving target in the time dimension, the target hierarchical module being a hierarchical module located at an upper stage of the multi-kernel temporal processing module, and the target pixels being pixels having identical positions in the first feature data outputted by the target hierarchical module; and
    performing, by using the mean-pooling layer, mean pooling processing on first feature data outputted by a last-stage hierarchical module, to obtain the motion state feature of the moving target.

3. The method according to claim 2, wherein the performing, in the time dimension according to the time information of the video frames, the convolution processing comprises:
    determining, according to the time information of the video frames, first temporal feature data which, in the time dimension, corresponds to the target pixels in the first feature data outputted by the target hierarchical module;
    performing the convolution processing on each first temporal feature data, to obtain corresponding second temporal feature data; and
    determining, according to corresponding positions of the target pixels in each second temporal feature data, second feature data which, in a spatial dimension, corresponds to pixels having identical time information in the second temporal feature data.

4. The method according to claim 3, wherein the performing the convolution processing on each first temporal feature data comprises:
    performing, for each first temporal feature data, the convolution processing on the first temporal feature data by using a first preset quantity of one-dimensional convolutional layers with different convolution kernel sizes, to obtain a first preset quantity of feature data with different scales; and fusing the first preset quantity of feature data with different scales, to obtain the second temporal feature data corresponding to the first temporal feature data.

5. The method according to claim 4, wherein each one of the one-dimensional convolutional layers is a one-dimensional depthwise convolutional layer.

6. The method according to claim 3, further comprising:
reducing, from a first value to a second value, a quantity of channels for the first feature data corresponding to the video frames before the first temporal feature data is determined; and
resetting, from the second value to the first value, a quantity of channels for the second feature data after the second feature data is determined.

7. The method according to claim 1, wherein the obtaining the video frame sequence comprises:
extracting, according to a time sequence of video frames in a video, one video frame from the video every preset quantity of video frames; and
setting, in response to a determination that a quantity of extracted video frames reaches a second preset quantity, the second preset quantity of extracted video frames as the video frame sequence.

8. The method according to claim 1, wherein, prior to the obtaining the motion state feature, the neural network model is trained by:
obtaining a video sample set, each video sample in the video sample set comprising a video frame sequence marked with a category identifier, the category identifier being used for representing an action category corresponding to a moving target comprised in the respective video frame sequence;
obtaining, according to the video samples in the video sample set and by using the neural network model, a motion state feature representing the moving target that is expressed in a time sequence of the video samples;
determining, according to the motion state feature and by using a classifier, a prediction probability that the moving target comprised in the video samples pertains to each action category; and
optimizing weight parameters of the neural network model and the classifier according to the prediction probability and the category identifier.

9. The method according to claim 8, wherein the neural network model comprises a plurality of hierarchical modules, at least one multi-kernel temporal processing module, and a mean-pooling layer, each multi-kernel temporal processing module of the at least one multi-kernel temporal processing module being disposed between two adjacent hierarchical modules in the plurality of hierarchical modules, and the mean-pooling layer being located behind a last hierarchical module; and
the obtaining, according to the video samples in the video sample set and by using the neural network model, the motion state feature representing the moving target that is expressed in the time sequence of the video samples comprises:
extracting first feature data corresponding to video frames in the video samples from input data stage by stage by using the hierarchical modules and outputting the first feature data, each first feature data comprising a spatial feature representing the moving target in the video frames, input data of a first-stage hierarchical module comprising the video samples, and input data of other stages of hierarchical modules being data outputted by a hierarchical module or a multi-kernel temporal processing module located at an upper stage thereof, and
performing, in a time dimension according to time information of the video frames and by using the multi-kernel temporal processing module, convolution processing on target pixels in first feature data outputted by a target hierarchical module, to obtain corresponding second feature data, each second feature data comprising a time sequence feature representing the moving target in the time dimension, and
performing, by using the mean-pooling layer, mean pooling processing on first feature data outputted by a last-stage hierarchical module, to obtain the motion state feature of the moving target in the video samples.

10. A non-transitory computer-readable storage medium, storing computer-readable instructions thereon, which, when executed by a video processing apparatus, cause the video processing apparatus to perform the method according to claim 1.

11. A neural network model, comprising:
processing circuitry configured as a plurality of hierarchical modules, at least one multi-kernel temporal processing module, and a mean-pooling layer, each multi-kernel temporal processing module of the at least one multi-kernel temporal processing module being disposed between two adjacent hierarchical modules in the plurality of hierarchical modules, and the mean-pooling layer being located behind a last hierarchical module, wherein
the hierarchical modules are configured to extract first feature data corresponding to video frames in a video frame sequence from input data stage by stage and output the first feature data, each first feature data comprising a spatial feature representing a moving target in the video frames, input data of a first-stage hierarchical module comprising the video frame sequence, and input data of other stages of hierarchical modules being data outputted by a hierarchical module or a multi-kernel temporal processing module located at an upper stage thereof;
the multi-kernel temporal processing module is configured to perform, in a time dimension according to time information of the video frames, convolution processing on target pixels in first feature data outputted by a target hierarchical module, to obtain corresponding second feature data, each second feature data comprising a time sequence feature representing the moving target in the time dimension, the target hierarchical module being a hierarchical module located at an upper stage of the multi-kernel temporal processing module, and the target pixels being pixels having identical positions in the first feature data outputted by the target hierarchical module; and
the mean-pooling layer is configured to perform mean pooling processing on first feature data outputted by a last-stage hierarchical module, to obtain a motion state feature of the moving target.

12. The neural network model according to claim 11, wherein the at least one multi-kernel temporal processing module comprises: a first dimensional transformation layer, a multi-kernel temporal convolutional layer, and a second dimensional transformation layer;
the first dimensional transformation layer is configured to determine, according to the time information of the video frames, first temporal feature data which, in the time dimension, corresponds to the target pixels in the first feature data outputted by the target hierarchical module;

the multi-kernel temporal convolutional layer is configured to perform, for each target pixel, the convolution processing on the first temporal feature data corresponding to the target pixels, to obtain second temporal feature data; and the second dimensional transformation layer is configured to determine, according to corresponding positions of the target pixels in each second temporal feature data, second feature data which, in a spatial dimension, corresponds to pixels having identical time information in the second temporal feature data.

13. A video processing apparatus, comprising:
processing circuitry configured to
    obtain a video frame sequence comprising a moving target;
    obtain, according to the video frame sequence and by using a neural network model, a motion state feature representing the moving target, the motion state feature being expressed in a time sequence of the video frame sequence; and
    obtain a result of matching between the motion state feature of the moving target and a motion state feature of a designated target, wherein:
    in response to obtaining the result of matching between the motion state feature of the moving target and the motion state feature of the designated target, the processing circuitry is further configured to:
    determine the moving target as the designated target in response to a determination that a similarity between the motion state feature of the moving target and the motion state feature of the designated target is greater than a threshold; or
    obtain, according to the motion state feature of the moving target and by using a classifier, a probability that the moving target pertains to an action category corresponding to the designated target, the classifier being obtained through training according to the motion state feature of the designated target.

14. The video processing apparatus according to claim 13, wherein the neural network model comprises a plurality of hierarchical modules, at least one multi-kernel temporal processing module, a mean-pooling layer, each multi-kernel temporal processing module of the at least one multi-kernel temporal processing module being disposed between two adjacent hierarchical modules in the plurality of hierarchical modules, and the mean-pooling layer being located behind a last hierarchical module; and
    to obtain, according to the video frame sequence and by using the neural network model, the motion state feature, the processing circuitry is configured to
    extract first feature data corresponding to video frames in the video frame sequence from input data stage by stage by using the hierarchical modules and outputting the first feature data, each first feature data comprising a spatial feature representing the moving target in the video frames, input data of a first-stage hierarchical module comprising the video frame sequence, and input data of other stages of hierarchical modules each being data outputted by a hierarchical module or a multi-kernel temporal processing module located at an upper stage thereof;
    perform, in a time dimension according to time information of the video frames and by using the multi-kernel temporal processing module, convolution processing on target pixels in first feature data outputted by a target hierarchical module, to obtain corresponding second feature data, each second feature data comprising a time sequence feature representing the moving target in the time dimension, the target hierarchical module being a hierarchical module located at an upper stage of the multi-kernel temporal processing module, and the target pixels being pixels having identical positions in the first feature data outputted by the target hierarchical module; and
    perform, by using the mean-pooling layer, mean pooling processing on first feature data outputted by a last-stage hierarchical module, to obtain the motion state feature of the moving target.

15. The video processing apparatus according to claim 14, wherein to perform, in the time dimension according to the time information of the video frames, the convolution processing, the processing circuitry is configured to:
    determine, according to the time information of the video frames, first temporal feature data which, in the time dimension, corresponds to the target pixels in the first feature data outputted by the target hierarchical module;
    perform the convolution processing on each first temporal feature data, to obtain corresponding second temporal feature data; and
    determine, according to corresponding positions of the target pixels in each second temporal feature data, second feature data which, in a spatial dimension, corresponds to pixels having identical time information in the second temporal feature data.

16. The video processing apparatus according to claim 15, wherein, to perform the convolution processing on each first temporal feature data, the processing circuitry is configured to:
    perform, for each first temporal feature data, the convolution processing on the first temporal feature data by using a first preset quantity of one-dimensional convolutional layers with different convolution kernel sizes, to obtain a first preset quantity of feature data with different scales; and
    fuse the first preset quantity of feature data with different scales, to obtain the second temporal feature data corresponding to the first temporal feature data.

17. The video processing apparatus according to claim 16, wherein each one of the one-dimensional convolutional layers is a one-dimensional depthwise convolutional layer.

18. The video processing apparatus according to claim 15, wherein the processing circuitry is further configured to:
    reduce, from a first value to a second value, a quantity of channels for the first feature data corresponding to the video frames before the first temporal feature data is determined; and
    reset, from the second value to the first value, a quantity of channels for the second feature data after the second feature data is determined.

19. The video processing apparatus according to claim 13, wherein, to obtain the video frame sequence, the processing circuitry is configured to:
    extract, according to a time sequence of video frames in a video, one video frame from the video every preset quantity of video frames; and
    set, in response to a determination that a quantity of extracted video frames reaches a second preset quantity, the second preset quantity of extracted video frames as the video frame sequence.

* * * * *